US011831453B2

(12) United States Patent
Skuratowicz et al.

(10) Patent No.: US 11,831,453 B2
(45) Date of Patent: Nov. 28, 2023

(54) METHODS AND SYSTEMS FOR PROVIDING COMMUNICATION BETWEEN USERS BASED ON VIRTUAL PROXIMITY AND AVAILABILITY STATUS

(71) Applicant: Verizon Patent and Licensing Inc., Basking Ridge, NJ (US)

(72) Inventors: David Skuratowicz, Felton, CA (US); Alagu Periyannan, Palo Alto, CA (US); Mohammad Raheel Khalid, Budd Lake, NJ (US); Selina Hu, Seattle, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/219,518

(22) Filed: Mar. 31, 2021

(65) Prior Publication Data

US 2022/0321370 A1  Oct. 6, 2022

(51) Int. Cl.
*H04L 12/18* (2006.01)
*G06F 3/16* (2006.01)

(52) U.S. Cl.
CPC .......... *H04L 12/1822* (2013.01); *G06F 3/165* (2013.01); *H04L 12/1827* (2013.01)

(58) Field of Classification Search
CPC . H04L 12/18; H04L 12/1822; H04L 12/1827; H04L 12/1813; G06F 3/165; G06F 3/048; A63F 13/87; G06Q 10/10
See application file for complete search history.

(56) References Cited

U.S. PATENT DOCUMENTS

| | | | | |
|---|---|---|---|---|
| 6,559,863 | B1* | 5/2003 | Megiddo | H04N 7/15 348/E7.083 |
| 6,784,901 | B1* | 8/2004 | Harvey | H04L 69/329 715/848 |
| 7,840,668 | B1* | 11/2010 | Sylvain | A63F 13/87 709/224 |
| 8,826,133 | B2* | 9/2014 | Ng | G06F 3/165 715/728 |
| 2004/0109023 | A1* | 6/2004 | Tsuchiya | A63F 13/54 709/205 |

(Continued)

OTHER PUBLICATIONS

Tupper, "The Sound of Progress", Jul. 31, 2019, medium.com <https://medium.com/vrchat/vrchat-the-sound-of-progress-3c4ab4fb5472> (Year: 2019).*

*Primary Examiner* — Liang Y Li

(57) ABSTRACT

An illustrative communication provider system determines that a first virtual location of a first avatar in a shared virtual space is proximate to a second virtual location of a second avatar in the shared virtual space. The first avatar represents a first user and the second avatar represents a second user located remotely from the first user. The communication provider system detects an availability status of the second user, and, based on the availability status of the second user and the determination that the first virtual location of the first avatar is proximate to the second virtual location of the second avatar, the communication provider system provides audio content for presentation to the second user. The audio content is representative of a spoken communication by the first user. Corresponding methods and systems are also disclosed.

20 Claims, 10 Drawing Sheets

(56) References Cited

U.S. PATENT DOCUMENTS

| | | | |
|---|---|---|---|
| 2009/0276707 A1* | 11/2009 | Hamilton, II | H04L 51/222 715/753 |
| 2010/0067718 A1* | 3/2010 | Amsterdam | A63F 13/87 381/107 |
| 2010/0077318 A1* | 3/2010 | Alkov | G06Q 10/107 715/753 |
| 2010/0146408 A1* | 6/2010 | Amsterdam | G06F 3/011 715/757 |
| 2016/0196596 A1* | 7/2016 | Van Wie | H04L 12/1813 705/26.41 |
| 2021/0352244 A1* | 11/2021 | Benedetto | H04N 7/15 |
| 2022/0023756 A1* | 1/2022 | Ko | A63F 13/424 |
| 2022/0078374 A1* | 3/2022 | Au | G06F 3/04817 |

\* cited by examiner

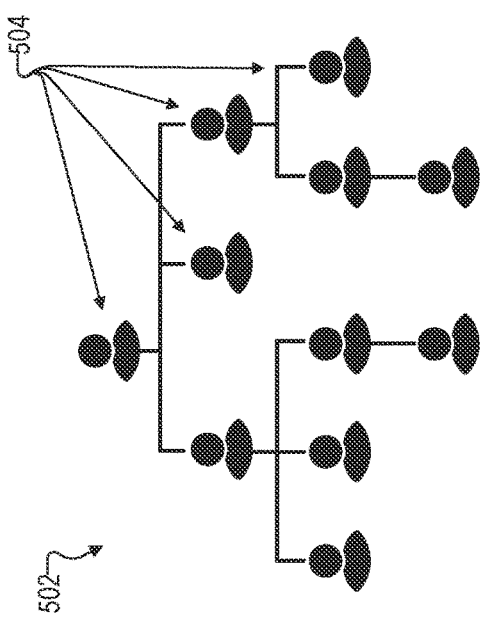

Fig. 5A

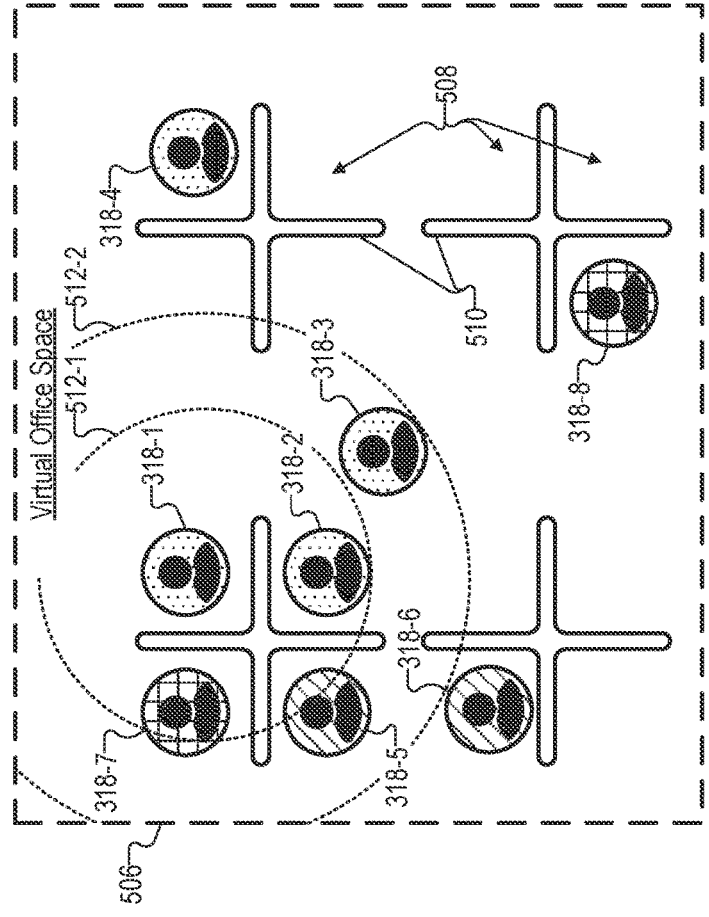

Fig. 5B

| 514 | User 1 | User 2 | User 3 | User 4 | User 5 | User 6 | User 7 | User 8 |
|---|---|---|---|---|---|---|---|---|
| Impromptu Spoken Communication | | Present (High Sound Intensity) | Present (Low Sound Intensity) | Abstain from Presenting | Abstain from Presenting | Abstain from Presenting | Abstain from Presenting | Abstain from Presenting |
| Initiate Communication Session | | Provide Option to Accept | Provide Option to Accept | Provide Option to Accept | Provide Option to Accept | Provide Option to Accept | Omit Option to Accept | Omit Option to Accept |

Fig. 5C

METHODS AND SYSTEMS FOR PROVIDING COMMUNICATION BETWEEN USERS BASED ON VIRTUAL PROXIMITY AND AVAILABILITY STATUS

BACKGROUND INFORMATION

The combination of various conditions and events in recent years has created a demand for ever more effective, convenient, and flexible ways of facilitating communication between people who are located remotely from one another. As one example, a global pandemic and other factors have driven a dramatic increase in the number of people who perform some or all their work from home or other convenient locations rather than from a physical office space or other shared physical space.

Many positive consequences have attended these increases in remote communication and telecommuting. For example, office workers may, in many ways, be more comfortable working from home than in an office, and may use time previously reserved for commuting as additional work time or free time, thereby increasing their efficiency and/or sense of morale and work-life balance. Unfortunately, along with these gains in time efficiency and morale that have resulted from remote working trends, certain communication challenges have also presented themselves. For example, when employees do not share a physical space and are forced to take deliberate steps to initiate communication exchanges (e.g., phone calls, video calls, text chats, etc.), some important impromptu interactions (e.g., hallway conversations, office pop-ins, conversations that are overheard and joined without explicit invitations, etc.) have diminished.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

FIG. 5A shows an illustrative organization that employs a workforce of employees in accordance with principles described herein.

FIG. 5B shows an illustrative virtual office space in which avatars representing employees from the workforce of FIG. 5A are virtually located in accordance with principles described herein.

FIG. 5C shows an illustrative chart indicating whether and how different types of communications by one user may be presented to various other users based on virtual proximity and availability status of the users in accordance with principles described herein.

DETAILED DESCRIPTION OF EXAMPLE EMBODIMENTS

Figure 1:
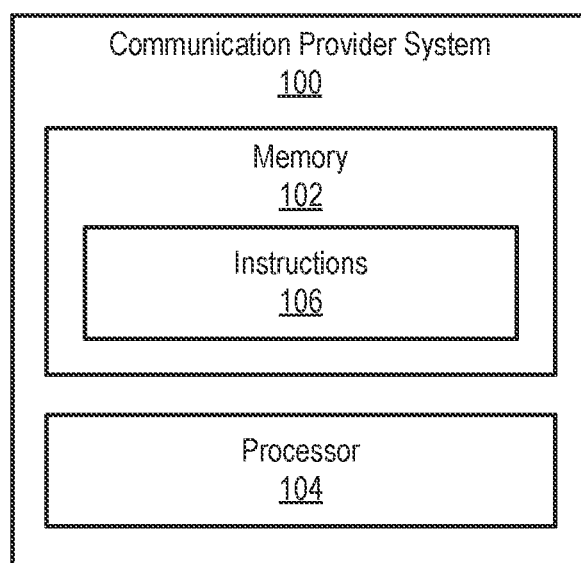
FIG. 1 shows an illustrative communication provider system configured to provide communication between users based on virtual proximity and availability status in accordance with principles described herein.

Methods and systems for providing communication between users based on virtual proximity and availability status are described herein. As mentioned above, certain challenges have presented themselves alongside the various advantages of increased remote communication trends. For instance, coworkers may no longer enjoy the ability to casually converse in the breakroom while having a snack, to chat briefly when passing in the hall, to subconsciously overhear conversations by others within an open workspace (e.g., conversations that, if relevant, a worker may choose to join in on), and so forth. Some organizations (e.g., companies, firms, practices, non-profits, etc.) are discovering that, over time, these challenges can take a toll on social capital within the organization. For instance, these challenges may create meeting fatigue (since preplanned calls and meetings generally must be relied on for any communication to take place), may contribute to a lack of workplace camaraderie and effective teamwork, may reduce informal cross-departmental and/or skip-level interactions, and may thereby generally lead to less collaboration, less innovation, less efficiency, and/or other undesirable outcomes.

Systems and methods described herein for providing communication between users based on virtual proximity and availability status address these challenges and improve these outcomes in various ways. For instance, rather than requiring remote communication to be actively initiated (e.g., sending a message, scheduling and joining a meeting, placing a call, etc.), systems and methods described herein may facilitate impromptu and informal communications such as described above by attributing virtual locations to each user logged into a virtual communication portal and generally leaving communication channels open (e.g., leaving microphones and speakers on, etc.) throughout the workday in a way that facilitates real-world interactions. In this way, for example, users (e.g., employees of the organization who are working from home and virtually located within a shared virtual space, etc.) may communicate in an informal and impromptu manner by simply beginning to talk. As such spoken communication is captured, communication provider systems described herein direct the spoken communication to be presented to other users who are within the virtual vicinity of the user who is speaking (provided that these users are available for receiving such communications), while not distracting users virtually outside of the vicinity of the speaking user.

As will be described in more detail below, these systems and methods may allow users to engage in and/or overhear various informal conversations happening in their virtual vicinity in a natural way that reduces the challenges described above and leads to easier collaboration, increased social capital, and other desirable outcomes. Additionally, such methods of facilitating impromptu communications may be closely integrated with convenient options for converting impromptu communications into more formal or private conversations (e.g., analogous to deciding to step from the hallway into a conference room as a conversation develops or when a whiteboard would be useful, etc.).

Along with promoting community and innovation through spontaneous collaboration in the ways described above, systems and methods described herein may further provide various additional advantages and benefits. For example, users may be enabled to visually search for and connect in real-time with co-workers based on department, programs, communication hierarchy, or other attributes. Additionally, users may create or join working clusters (e.g., virtual areas of a shared virtual space) that center around particular projects, shared interests, or other commonalities between users. Within shared virtual spaces, users may freely come and go in a natural manner similar to a physical space. Moreover, user may post and/or view sticky notes, visual designs, flowcharts, and even 3D sculptures within the shared virtual space to further spark innovation and collaboration and/or otherwise increase the efficiency and effectiveness of the shared space.

Shared virtual office spaces of organizations like companies or firms provide a convenient illustrative use case for the types of spaces where systems and methods described herein may be highly effective and helpful. However, it will be understood that principles described herein may also be applied to various other types of shared virtual spaces for various other types of use cases as may serve a particular implementation. For example, such spaces and applications may include entertainment spaces (e.g., a virtual theater for screening a movie for a virtual movie festival, a virtual sports box for watching a sporting event with friends, etc.), virtual convention venues (e.g., virtual spaces configured to host large-scale conferences, forums, trade shows, rallies, or other conventions, etc.), spaces configured with games and other interactive events (e.g., used for hosting family or class reunions, virtual birthday parties, etc.), and/or any other shared virtual spaces as may serve a particular implementation.

Additional use cases that may be served by systems and methods described herein may relate to applications such as control room applications (e.g., used during and after an event to oversee everything and make sure it goes as planned), health care applications (e.g., to help patients move through prescribed steps during a visit such as checking in, talking to the doctor, checking out, etc.), help desk applications (e.g., allowing people to virtually walk up to a virtual information technology ("IT") help desk or corporate security desk), education applications (e.g., study groups, labs and higher education classes, etc.), team building applications, hybrid applications (e.g., in which users in the office interact with remote users), human resources applications (e.g., to facilitate employee onboarding, recruiting, compensation negotiations, etc.), and/or any other applications as may serve a particular implementation.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Methods and systems described herein for providing communication between users based on virtual proximity and availability status may provide any of the benefits mentioned above, as well as various additional and/or alternative benefits that will be described and/or made apparent below.

FIG. 1 shows an illustrative communication provider system 100 ("system 100") configured to provide communication between users based on virtual proximity and availability status in accordance with principles described herein. System 100 may be implemented by computer resources such as processors, memory facilities, storage facilities, communication interfaces, and so forth. In some examples, system 100 may be implemented by user equipment ("UE") devices such as personal computers, mobile devices, communication devices, or other equipment used directly by end users. Additionally or alternatively, certain or all aspects of system 100 may be implemented by computing systems that are not directly used by users (e.g., data servers configured to provide communication services, distributed computing systems operated by a communications provider (e.g., multi-access edge computing ("MEC") servers), distributed computing systems operated by a cloud-computing provider (e.g., multi-access cloud servers), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with providing communication between users based on virtual proximity and availability status as described herein and/or as may serve a particular implementation.

Figure 2:
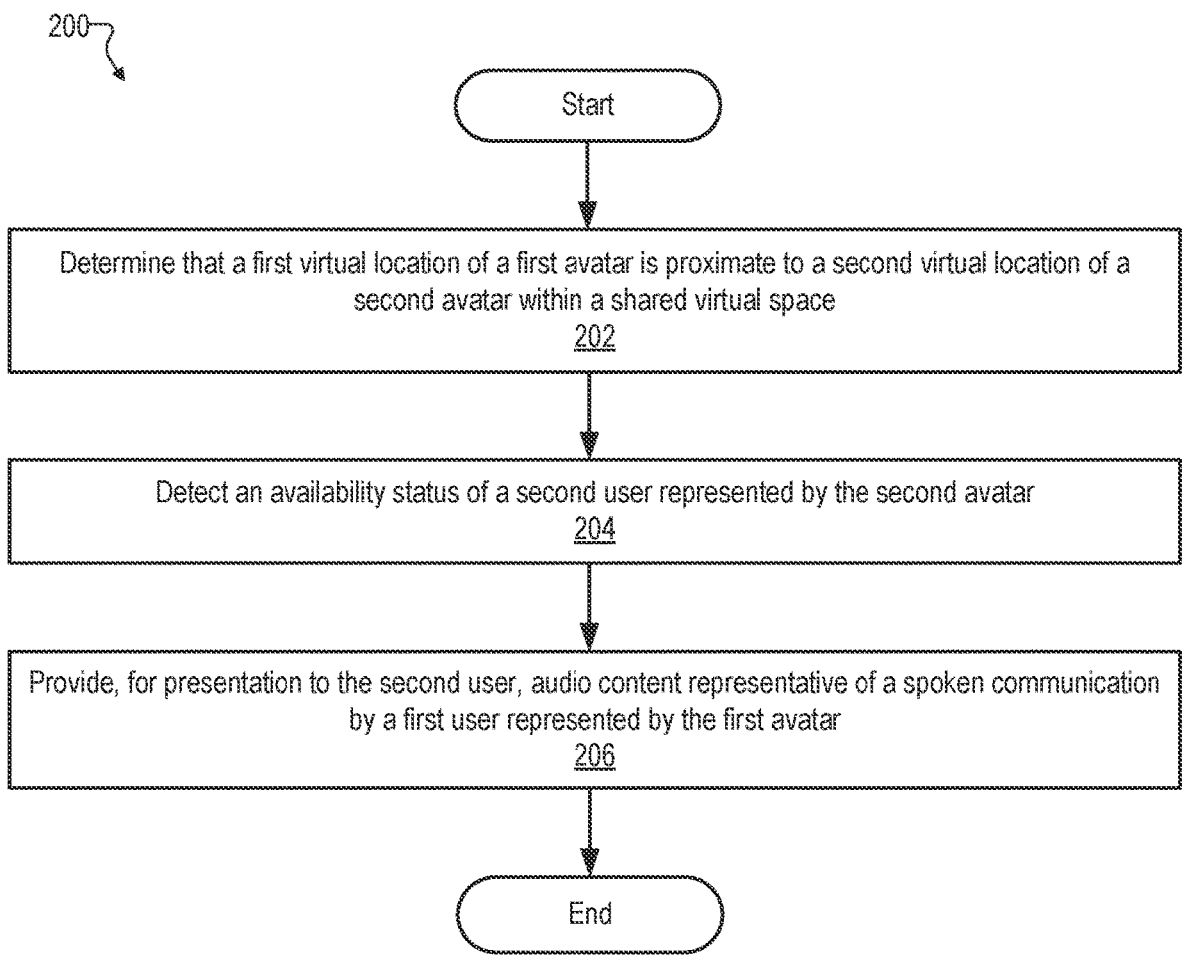
FIG. 2 shows an illustrative method for providing communication between users based on virtual proximity and availability status in accordance with principles described herein.

As one example of functionality that processor 104 may perform, FIG. 2 shows an illustrative method 200 for providing communication between users based on virtual proximity and availability status in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a communication provider system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by system 100 (e.g., by processor 104 as processor 104 executes instructions 106 stored in memory 102).

At operation 202, system 100 may determine that a first virtual location of a first avatar in a shared virtual space is proximate to a second virtual location of a second avatar in the shared virtual space. For instance, as mentioned above, the shared virtual space may be implemented as a virtual office space or another suitable virtual space (e.g., including any of the virtual spaces configured to support any of the applications or use cases mentioned herein) that is shared by a plurality of users represented by avatars within the virtual space. For the example of method 200, it will be understood that the first avatar in the shared virtual space may represent a first user while the second avatar proximate to the first avatar may represent a second user different from the first user. For example, the second user may be located remotely from the first user (e.g., both users being located in their respective homes and both telecommuting to a virtual office, one user in a physical office and the other telecommuting from home, etc.).

At operation 204, system 100 may detect an availability status of the second user. For example, as will be described in more detail below, the availability status may indicate that the second user is available for all types of communication (e.g., impromptu communications, prearranged communication sessions, etc.), is available only for certain types of communication, or is currently unavailable for communication (e.g., due to being in a meeting or other ongoing communication, due to the user having selected an unavailable status to focus on an urgent task, etc.). As will further be described in more detail below, system 100 may indicate the availability status of the second user on a depiction of the shared virtual space presented to the first user such that the first user is apprised of the availability status and can communicate (or abstain from communicating) accordingly.

At operation 206, system 100 may provide audio content for presentation to the second user. For example, the audio content may be representative of a spoken communication by the first user and may be provided based on the availability status of the second user detected at operation 204 and based on the determination at operation 202 that the first virtual location of the first avatar is proximate to the second virtual location of the second avatar.

In some examples, the spoken communication by the first user may be spoken in an impromptu manner. As used herein, "impromptu" communication may refer to communication that is not prearranged or exchanged as part of a pre-initiated communication session such as a phone call, video call, virtual meeting, or the like. Instead of prearranging and/or initiating a formal communication session, impromptu communication may consist of informal interaction that the first user communicates by simply beginning to speak and that the second user receives (e.g., hears) without the second user explicitly agreeing to or accepting the communication in any way when his or her availability status is set to allow for such communications. In this way, as will be described in more detail below, users may not only communicate with one another more easily and conveniently, but may also overhear other conversations around them (e.g., conversations that may be important or of interest and that the users may choose to organically join into), offer brief greetings or goodbyes that create a sense of cohesion often missing from remote communications, ask quick questions or make inconsequential comments in a natural way (as one may do in person but may hesitate or decline to do if a communication session has to be initiated), and so forth.

Figure 3:
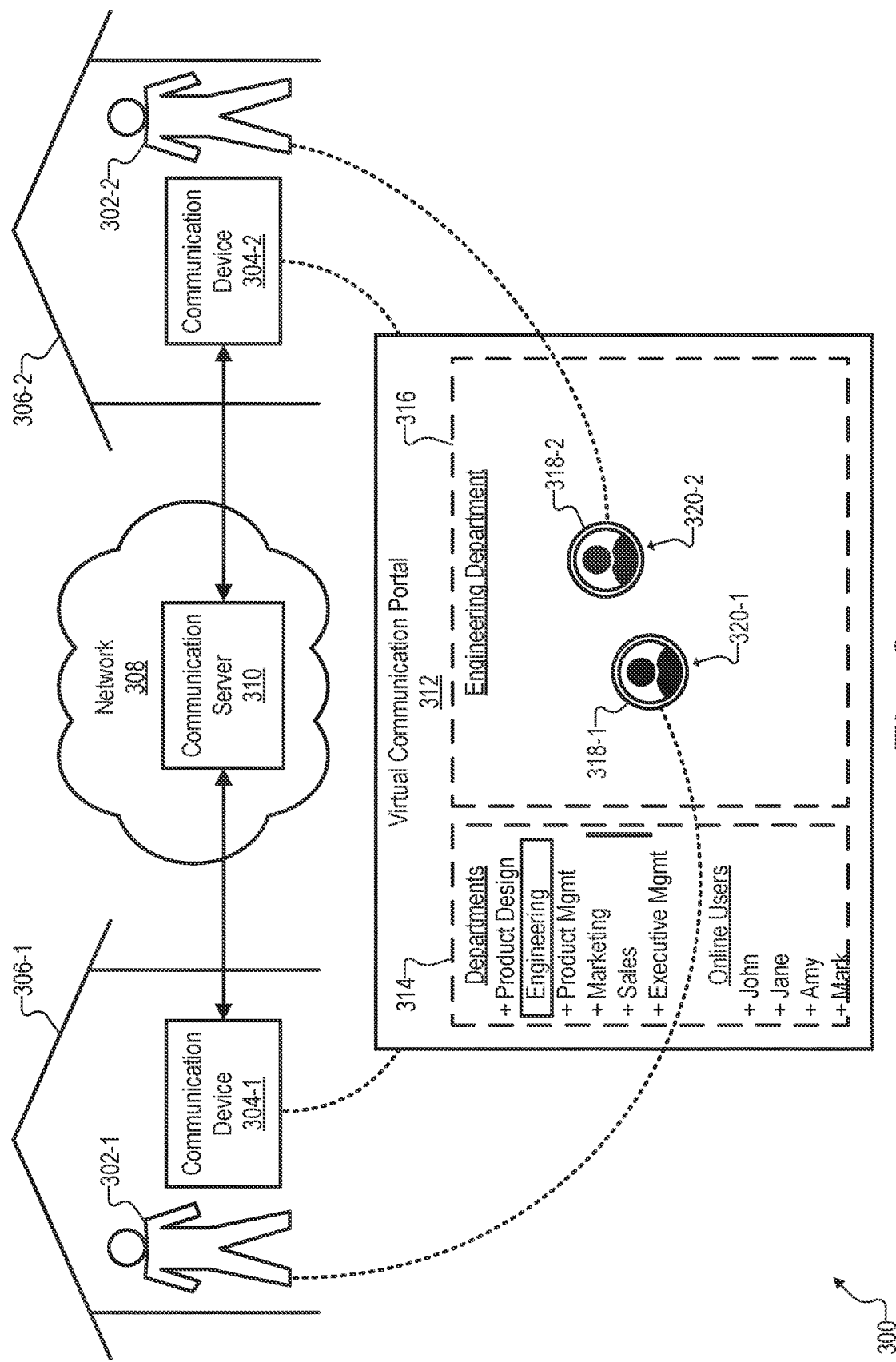
FIG. 3 shows an illustrative configuration in which the communication provider system of FIG. 1 may operate in accordance with principles described herein.

FIG. 3 shows an illustrative configuration 300 in which system 100 may operate in accordance with principles described herein. Specifically, as shown, configuration 300 shows first and second users 302 (i.e., users 302-1 and 302-2) that use respective communication devices 304 (i.e., communication devices 304-1 and 304-2) to communicate from different remote sites 306 (i.e., sites 306-1 and 306-2) over a network 308 that may employ a communication server 310 to facilitate or manage the communication. An implementation of system 100 may be implemented within either or both communication devices 304, within communication server 310 or components of network 308, or by computing resources spread across a combination of these or other suitable systems and devices. In certain examples, each communication device 304 may be associated with (e.g., may implement or be communicatively coupled with) a respective implementation of system 100 that may function in similar ways to provide communication capabilities for the respective users 302 using the communication devices 304.

Also shown in configuration 300 is a virtual communication portal 312 that may be produced or otherwise provided by system 100 to be presented to users 302 by way of communication devices 304. As shown, virtual communication portal 312 may include a navigation panel 314 and a shared virtual space 316 that includes different avatars 318 (e.g., an avatar 318-1 representing user 302-1 and an avatar 318-2 representing user 302-2) depicted at different locations 320 (e.g., location 320-1 for avatar 318-1 and location 320-2 for avatar 318-2) within shared virtual space 316.

Within a configuration such as configuration 300, system 100 may perform method 200 and/or any of the other operations described herein. Certain aspects of components depicted in configuration 300 will now be described in more detail.

Users 302 may represent persons who are using system 100 in any suitable way, such as to communicate with one another or with other users who are not explicitly shown in configuration 300. For example, users 302 may represent employees of an organization (e.g., a company) who are working from home and need to communicate with one another and/or with other employees (e.g., other employees working from home, employees that are in the office, etc.) as part of their work assignments. To this end, users 302 may use their respective communication devices 304-1, which may be implemented by user equipment devices such as mobile devices (e.g., smartphones, tablet devices, etc.), personal computer devices (e.g., laptop or desktop computers, etc.), or other such devices that are used by users 302 to perform work-related tasks or otherwise to communicate as may be desirable for a particular communication application or use case.

In the example of configuration 300, sites 306 may be understood to represent two unrelated sites that are remote from one another. For example, sites 306 may represent the respective homes of users 302, which may be at different addresses nearby one another (e.g., in the same city, etc.) or across the country or the world from one another. As another example, one or both of sites 306 may represent remote workspaces other than home in which users 302 are working at a given time. For instance, sites 306 may represent college campuses, coffee shops, temporary office spaces, or the like. In certain cases, sites 306 may represent different physical offices that are operated (e.g., owned or leased) by a particular organization, such as different offices of the organization located in different cities. Sites 306 may also represent different offices within the same building (e.g., an apartment building, a physical office building) if the sites are remote enough from one another that it is desirable for users 302 to communicate electronically using virtual communication portal 312 rather than in person. Additional examples of sites from which users 302 may communicate using a virtual communication portal will be described in more detail below.

Network 308 may be implemented by any suitable network or networks that include any elements or technologies as may serve a particular implementation. For instance, network 308 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 308 may include elements of various interconnected networks that are outside of any provider network and outside the control of any provider of such a provider network. Elements of the Internet, a wide area network, a content delivery network, and/or any other suitable network or networks are examples of other elements that may be included within network 308. Any of these provider or non-provider networks or network elements may provide data delivery between communication devices 304-1 and 304-2.

Communication server 310 may be communicatively coupled to either or both of communication devices 304 by way of network 308 and may facilitate communications between communication devices 304 in any manner as may serve a particular implementation. For instance, in certain implementations, communication server 310 may represent a MEC server device, cloud server device, or other distributed computing device that manages communication data between communication devices 304 in the ways described herein. As mentioned above, in certain examples, system 100 may be fully or partially implemented by communication server 310. In other examples, implementations of system 100 may exist on each of communication devices 304 and communication server 310 may be omitted or perform other operations to facilitate the communication provided by communication device 304. In some implementations, multiple communications servers 310 may be employed in a distributed fashion, such as for purposes of scalability, redundancy, and service quality (e.g., latency reduction), and system 100 may be deployed across such multiple communications servers 310.

Figure 4:
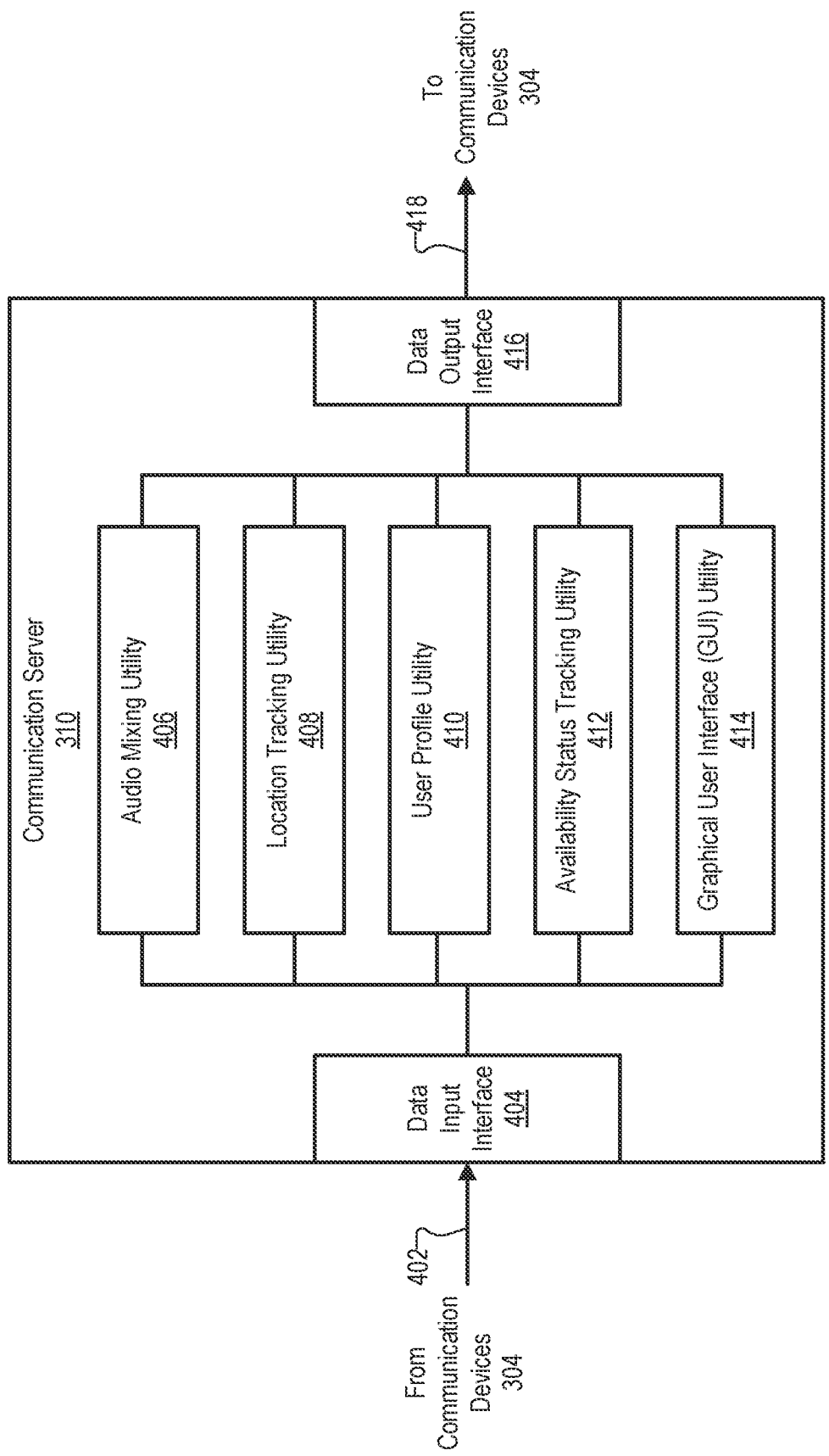
FIG. 4 shows an illustrative implementation of a communication server such as is included in the configuration of FIG. 3 in accordance with principles described herein.

To illustrate one particular way that communication server 310 may be implemented in certain embodiments, FIG. 4 shows an illustrative implementation of communication server 310 that includes various data inputs, data outputs, communication interfaces, and processing utilities to perform operations described herein. Specifically, as shown in FIG. 4, this implementation of communication server 310 receives input data 402 from one or more communication devices 304 using a data input interface 404, which provides relevant input data to an audio mixing utility 406, a location tracking utility 408, a user profile utility 410, an availability status tracking utility 412, and a graphical user interface ("GUI") utility 414. As shown, each of these and/or any other utilities not explicitly shown may communicate with one another by way of a service bus or another suitable architecture or form of communication. Audio mixing utility 406 may generate audio data, while GUI utility 414 may generate and/or update user interface data (e.g., video data) for display in a graphical user interface such as virtual communication portal 312. As shown, this audio data and user interface data may be provided to a data output interface 416 that provides this information to communication devices 304 as output data 418. Each of the components shown in FIG. 4 will now be described in more detail.

Input data 402 may include any suitable data received (e.g., transmitted in real time) from one or more communication devices such as communication devices 304-1 and 304-2 shown in configuration 300. Input data 402 may include audio data such as voice data representative of impromptu communication being spoken by one of users 302 or voice data that is part of a communication session such as a call or conference. Input data 402 may also include other types of user input data and/or metadata that may, for instance, indicate when a user 302 logs into the communication portal, where a user 302 desires to set and/or move the location of his or her avatar 318, whether a user 302 is available for various types of communication, profile information associated with the user, and so forth.

Data input interface 404 may receive input data 402 by way of a network such as network 308. As such, data input interface 404 may be configured to communicate with communication device 304 by way of any technologies and/or protocols supported by the network as may serve a particular implementation. In some examples, data input interface 404 may preprocess, sort, and/or steer input data 402 to utilities 406-414 to ensure that each utility receives any input data that is relevant to the function of that utility.

Audio mixing utility 406 may receive and process audio input data (e.g., by way of data input interface 404) and output audio data (e.g., by way of data output interface 416) to be presented to different users 302 by their respective communication devices 304. As such, audio mixing utility 406 may receive data from location tracking utility 408 (e.g., to determine where a particular user's avatar is located in relation to other users' avatars to properly mix impromptu communications), user profile utility 410 (e.g., to determine if a user is logged in, is engaging in a formal communication session, etc.), availability status tracking utility 412 (e.g., to determine whether the particular user's avatar is available to receive certain types of communication such as impromptu communication), and/or other utilities (e.g., including utilities not explicitly shown in FIG. 4) as may serve a particular implementation.

As with each of the utilities shown in FIG. 4, it will be understood that audio mixing utility 406 may be implemented by dedicated or shared hardware and/or software of communication server 310 to implement functionality described herein. For instance, in certain examples, a single processor (or group of processors) associated with communication server 310 may execute software instructions to implement audio mixing utility 406 and one or more additional utilities shown in FIG. 4 (including all of the utilities in certain examples). In other examples, each utility may be implemented by a separate server or server component (e.g., each being associated with a dedicated processor or the like) as may serve a particular embodiment.

As certain implementations of audio mixing utility 406 combine different sounds together into a single mix to be presented to a particular user (e.g., a mix including different impromptu communications from around the shared virtual space, etc.), audio mixing utility 406 may be configured to apply various filtering techniques, proximity effects, and so forth. For instance, in certain examples, a stereo mix may be provided to a particular communication device 304 and audio mixing utility 406 may configure the audio data to simulate directional audio that will seem to a user to originate from a particular direction within the shared virtual space. In this way, a user may sense which direction impromptu communication comes from to help the user (along with visual cues provided by the user interface) to discern who is speaking. Additionally, audio mixing utility 406 may access data representative of various aspects affecting the acoustics of the shared virtual space (e.g., the location of virtual objects such as walls, cubicle partitions, etc., in the space; the virtual materials from which such virtual objects are constructed and their acoustic properties; etc.). By taking these types of data into account, audio mixing utility 406 may simulate the impact of virtual barriers on audio propagation, accurately simulate sound propagation within the virtual environment, and so forth.

Location tracking utility 408 may receive and process user input data and provide, in real time, information regarding the virtual locations of each avatar included within a shared virtual space. From the time that a user logs into the communication portal until he or she logs out, location tracking utility 408 may identify, update, and/or otherwise keep track of the virtual location of an avatar of that user. As location tracking utility 408 generates this location data, location tracking utility 408 may provide the location data to GUI utility 414 to indicate where avatars for each user are to be placed within the shared virtual space. Additionally, the location data may be provided to audio mixing utility 406 to facilitate in audio mixing operations. For example, as will be described in more detail below, impromptu communication may be mixed at a sound intensity level that may depend on a relative proximity of one avatar to another. Additionally, location data may inform the audio mix since, as mentioned above, directional audio may be generated based on a relative direction from which an audio is virtually originated.

Location tracking utility 408 may be provided with virtual space configuration information, and may use the virtual space configuration information to enforce rules on the locations of avatars within a shared virtual space. For example, location tracking utility 408 may access space layout information (e.g., space sizing, barrier locations and characteristics, special space characteristics for designated areas such as meeting rooms, break rooms, etc.) from a data store. Location tracking utility 408 may then enforce rules based on the space layout information. For example, location tracking utility 408 may enforce that avatars do not move outside the shared virtual space, that avatars do not move through barriers, that avatars do not occupy the same space at the same time, that only a certain number of avatars occupy a given space, and/or any other such rules as may serve a particular implementation.

User profile utility 410 may receive and process user input data so as to provide, in real time, information regarding various aspects of each user's profile and/or current status that are to be graphically reflected in the graphical user interface of the portal. For example, user profile utility 410 may maintain images representative of each different user (e.g., profile photos of the users, etc.) that may be provided for display as part of the avatars presented in the shared virtual space. As another example, user profile utility 410 may manage invitations and/or acceptances of formal communication sessions and perform various other functions described herein. Additionally, user profile utility 410 may manage various settings and/or preferences for each user (e.g., information that may be reflected in navigation panel 314 as will be described below, etc.). For instance, user profile utility 410 may track whether each user is currently online, maintain data indicating which departments each user is part of and/or where the user fits in a reporting structure of an organization, manage a setting indicating whether a particular user has stereo audio capabilities that would support directional audio capabilities such as described above, and so forth.

Availability status tracking utility 412 may receive and process additional user input data that may be sent deliberately by a user or provided automatically by a communication device to indicate the current availability of the user. For example, if a user decides to lower his or her availability (e.g., to disable impromptu communications in order to focus on a particular task), availability status tracking utility 412 may receive data indicating this preference and adjust an availability status for the user. As another example, if a user places or accepts a voice call, availability status tracking utility 412 may determine at the commencement of the voice call that the availability status for the user should be changed for the duration of the call and may update the status accordingly. Availability status tracking utility 412 may provide the status data to any of the other utilities. For example, by providing the status data to audio mixing utility 406, audio mixing utility 406 may determine how to mix audio for each user (e.g., whether impromptu communication should be included in the mix or not, etc.). Additionally, availability status tracking utility 412 may provide information to GUI utility 414 to allow proper status to be reflected in the user interface (e.g., by way of color or other indicators on each avatar) in any of the ways described herein.

GUI utility 414 may receive data from data input interface 404 and/or from various other utilities 406-412 or other sources as have been described above and may provide visual data (e.g., video data, data allowing for a GUI to be constructed and/or updated by communication devices 304, etc.) to each communication device 304 by way of data output interface 416. In this way, GUI utility 414 may facilitate each communication device 304 in presenting various graphical aspects of a virtual communications portal such as virtual communication portal 312. For example, based on all the input data received, GUI utility 414 may provide data sufficient to allow a communication device 304 to present navigation panel 314, shared virtual space 316, and/or any other panels as may be included in a particular implementation of virtual communication portal 312. Moreover, as avatars move and change status, as different views are selected, and as other changes occur, GUI utility 414 may continually provide information allowing each communication device to provide a coherent and relevant user interface to its respective user 302.

Data output interface 416 may receive audio data, visual data, metadata, and/or any other suitable types of data from utilities 406-414, and may communicate this data as output data 418 to communication devices 304 by way of a network such as network 308. As such, like data input interface 404, data output interface 416 may be configured to communicate with communication devices 304 by way of any technologies and/or protocols supported by the network as may serve a particular implementation. In some examples, data output interface 416 may process, package, sort, address, and/or steer output data 418 to particular communication devices 304 to ensure that each communication device receives data relevant to the function of that communication device.

The components described above may be implemented in one or more communication servers 310, for example, in a distributed manner to facilitate scalability, redundancy, and service quality (e.g., latency reduction). As such, an individual communications server 310 may include one or more components described above, and may communicate amongst other communication servers 310 when necessary to access needed capabilities.

Returning to FIG. 3, virtual communication portal 312 represents a virtual portal that is implemented by hardware and software of system 100 and may be presented to either or both of users 302 by way of their respective communication devices 304. For example, virtual communication portal 312 may be presented when a user 302 logs in to his or her device or signs in to communication server 310 at the beginning of a workday, when user 302 authenticates himself or herself to join a convention or other event that makes use of virtual communication portal 312, or otherwise comes online to begin communicating with other users by way of system 100.

Within virtual communication portal 312, a navigation panel 314 is shown to include certain categories (e.g., "Departments," "Online Users," etc.) that may facilitate a user 302 in exploring and discovering communication possibilities, filtering potential people to communicate with in various ways, and so forth. For example, as shown in FIG. 3, a section of navigation panel 314 for departments may allow a user to select a shared virtual space associated with a particular department (e.g., "Product Design," "Engineering," "Product Management," "Marketing," "Sales," "Executive Management," etc.) within the organization to see only users who are logged in and work in that department. At the moment captured by FIG. 3, for example, the "Engineering" department is shown to be selected such that shared virtual space 316 is labeled "Engineering Department" and depicts avatars 318 that will be understood to represent employees who work for that department. In other modes not shown in FIG. 3, shared virtual spaces associated with several or all of the departments could be shown within virtual communication portal 312 at once so that all the users logged in from the entire organization could be seen at a glance.

Also shown in navigation panel 314 is an "Online Users" category that lists names of users who are online and may potentially be communicated with. As will be described in more detail below, whether a particular user may be communicated with (and the manner in which communications may be provided) may be determined at least in part by an availability status of the user. However, for online users who are available (e.g., "John," "Jane," "Amy," "Mark," etc.), navigation panel 314 may provide easy and convenient ways to initiate communications sessions such as audio or video calls between two users, virtual meetings with groups of users, and so forth. For example, by clicking on one of the online users in navigation panel 314, a user may be given various options for initiating communication with the selected user including, for instance, textual messaging, voice calls, video calls, ad-hoc or prearranged meetings, shared screen sessions, virtual whiteboarding sessions, virtual reality sessions, or the like.

Shared virtual space 316 is shown in this example to represent a particular department (i.e., the engineering department, as mentioned above). As such, avatars 318 for each user associated with the engineering department may be represented on a map of a shared virtual space representative of the engineering department. Specifically, as mentioned above and as illustrated by dotted lines, avatar 318-1 may represent user 302-1 and avatar 318-2 may represent user 302-2 within shared virtual space 316. In this example, each avatar 318 is depicted as a circular token or profile icon that may include a depiction (e.g., a photo, a drawing or symbol, etc.) representative of the respective user. In other examples, avatars 318 may be illustrated by two-dimensional or three-dimensional representations of the users as may serve a particular implementation.

Any suitable information about a user 302 that a particular avatar 318 represents may be indicated by the visual information presented by the avatar 318 within shared virtual space 316. For example, one piece of information that is readily apparent by looking at avatars 318 is their respective locations within shared virtual space 316. Specifically, avatar 318-1 is located at a first location 320-1 while avatar 318-2 is located at a second location 320-2 that is different from but relatively proximate to first location 320-1. Other information that may be visually indicated by avatars 318 is the availability status of their respective users, whether the users are actively speaking, and so forth. In some examples, communication may be initiated by clicking directly on avatars 318 (e.g., by way of a pop-up menu, etc.) in addition or as an alternative to communication initiated by way of navigation panel 314 in the ways described above.

As has been mentioned, methods and systems described herein for providing communication between users based on virtual proximity and availability status may find application in various contexts and with various use cases. With that understood, various example implementations referred throughout this description include implementations in which the shared virtual space is a virtual office space associated with an organization employing a workforce of employees and each employee in the workforce is associated with a different avatar that is represented in the shared virtual space when the employee is logged into a virtual communication portal.

To illustrate, FIG. 5A shows an illustrative organization 502 that employs a workforce of employees 504 in accordance with principles described herein. Organization 502 may be any type of organization of people, created for any purpose and structured in any manner, as may serve a particular implementation. For example, organization 502 may be a commercial organization such as a company or corporation, a non-profit organization such as a charity or church, a governmental organization, a services organization such as a firm (e.g., a law firm, a consulting firm, etc.) or practice (e.g., a medical practice, etc.), or any other type of organization as may serve a particular implementation.

As shown, employees 504 within organization 502 may be organized according to a reporting structure, such that one or more employees of the organization are in top leadership roles (e.g., executive leaders, presidents, board members, etc.) while other employees are in lower leadership roles (e.g., middle management) and still other employees report to the leadership. As a result, the structure may include several levels that each have one or more employees working as peers, reporting to a particular manager, and so forth. It will be understood that employees 504 may be users of a virtual communication portal such as virtual communication portal 312. For instance, one of employees 504 may act as user 302-1 and another employee 504 may act as user 302-2 in a communication scenario such as illustrated by configuration 300 of FIG. 3. While a relatively small number of employees is illustrated in FIG. 5A, it will be understood that organization 502 may, in certain examples, include hundreds or thousands of employees 504 structured in highly complex ways according to the needs of the organization.

FIG. 5B shows an illustrative virtual office space 506 in which avatars 318 (e.g., avatars 318-1 through 318-8) representing a variety of users (e.g., employees 504 of the workforce of organization 502) are virtually located. As shown above in configuration 300, user 302-1 may be represented by avatar 318-1 and user 302-2 may be represented by avatar 318-2. While other users are not explicitly shown in configuration 300, it will be understood that avatars 318-3 through 318-8 similarly represent respective users (e.g., employees 504) that may be located in various places (e.g., offices, homes, etc.) that may be remote from one another.

Similar to shared virtual space 316 in configuration 300, virtual office space 506 depicts each avatar 318 at a particular location within the space. Additionally, as shown in FIG. 5B, virtual office space 506 may depict other objects in the virtual office such as individual workspaces 508 assigned to particular employees (e.g., analogous to desks, cubicles, offices, etc. in a physical office space). In this example, partitions 510 defining workspaces 508 are shown to be arranged in groups (e.g., analogous to desk clumps in a physical office space) such that employees that are working on the same project or otherwise share common attributes may virtually work near one another for convenient access to one another (e.g., to build team camaraderie, to share ideas and/or ask questions of each other, etc.). For example, virtual location 320-1 of first avatar 318-1 may be associated with a first virtual workspace that is assigned to user 302-1, while virtual location 320-2 of second avatar 318-2 may be associated with a second virtual workspace that is assigned to user 302-2. As shown, the second virtual workspace where avatar 318-2 is located is proximate (e.g., immediately adjacent within the same grouping) to the first virtual workspace where avatar 318-1 is located within virtual office space 506.

While the objects shown in virtual office space 506 in FIG. 5B (e.g., partitions 510) are relatively minimal for illustrative purposes, it will be understood that in certain implementations, a shared virtual space such as virtual office space 506 may be depicted in any suitable way and with any number or type of objects to decorate and outfit the space in any manner as may serve a particular implementation. For example, rather than the top view of virtual office space 506 shown in FIG. 5B, certain implementations may employ a perspective or isometric view that provides a greater sense of depth and dimensionality for the virtual space. In some examples, different views (e.g., the top view, the isometric view, etc.) may be selected and switched between according to user preference. Additionally, different style treatments may be applied to certain implementations, including user-selectable style treatments (e.g., "skins") in some embodiments. For instance, one style treatment may be a minimalistic style with few objects other than the avatars (as shown in FIG. 5B), while other style treatments may include more detail (e.g., color and/or texture options for flooring, walls, desks, etc.), additional decorations (e.g., plants, desk chairs and other furnishings, water coolers, objects placed on desks, etc.), and so forth. The characteristics of the entities described above in the shared virtual space (e.g., location, styling, identifiers, etc.) may be stored, for example, in a data store accessible to location tracking utility 408 and/or GUI utility 414 such that the rendering of the visual representations of these entities may be correctly placed in the shared virtual space and the appearance may be presented in accordance with the appropriate style treatments.

As described above, under certain circumstances, users of a virtual communication portal may leave communication channels open (e.g., microphones engaged, speakers on, etc.) during many or all working hours in a particular workday. In this way, the users are not only able to communicate via conventional communication sessions (e.g., voice or video calls and meetings, etc.) but also may engage in impromptu communications that do not require any prior arrangements (e.g., placing a call, setting up a meeting, etc.) or approval actions (e.g., accepting a call, joining a meeting, etc.). Given that communication channels may be on for much of the time, controls may be placed on how communication (and especially impromptu communication) is delivered. For example, it may be undesirable under many circumstances (e.g., other than when an intercom option or the like is selected) for an impromptu communication by one user to be heard by every other user represented in the entire virtual office space. Certain such communication controls will now be described.

One type of control that may be placed on communication is control implemented manually or automatically by speaking users or listening users and/or their communication devices. For instance, keyboard shortcuts (e.g., "hot" keys, etc.) may be defined to make it easy and convenient for a user to mute himself or herself during the workday when saying something that is not meant to be communicated to others represented in the virtual office space (e.g., if the user is speaking to a family member in the physical space at home where the user is located, etc.). As another example, the communication device of a user may be configured to automatically filter out certain sounds physically present with the user that are not to be captured and/or presented to other users represented in the virtual office space. For instance, sounds originating from the user's own computer (e.g., music listened to while working, tutorial videos being viewed to learn a new task, etc.), noise in the room (e.g., from a fan, a lawnmower outside, a dog barking, etc.), and/or other sounds may be automatically filtered out and not provided as communications for presentation to other users. Similarly, in certain implementations, these manual and/or automatic filters may be implemented on the listening side in addition to (or as an alternative to) being implemented on the speaking side as described above.

Another type of control that may be placed on communication is location-based control. Location-based control refers to any limits placed on communication (e.g., whether a user is presented with a particular impromptu communication, whether a user is able to be invited to engage in a formal communication session, etc.) based on the location of avatars within the shared virtual space. For example, as has been described, certain communications such as impromptu communications may be delivered only to users whose avatars are located proximate to the avatar of a user providing the spoken communication.

To illustrate, a vicinity 512-1 is shown in FIG. 5B as a circle around avatar 318-1 for a scenario in which user 302-1 (i.e., the user represented by avatar 318-1) is speaking (and thereby originating an impromptu communication). Any user whose avatar 318 is within vicinity 512-1 may be presented audio content representative of this spoken communication by the first user because these users' avatars are considered to be proximate to avatar 318. Specifically, as shown, users represented by avatar 318-2 (i.e., representing user 302-1) and avatar 318-7 (representing a user not explicitly illustrated herein), could potentially be presented with the spoken communication as long as other communication controls do not limit the communication for other reasons. Virtual locations of avatars may be considered to be "proximate," as used herein, based on any proximity criteria as may serve a particular implementation. For instance, in the example of FIG. 5B, vicinity 512-1 is used to define proximity and is a circle with a particular radius extending from a center where a speaking avatar is located. In other examples, proximity may be determined by a vicinity that includes shapes other than circles, that accounts for features of the shared virtual space (e.g., all employees at a particular desk clump as defined by partitions 510), that is asymmetrical and/or directionally oriented, or the like.

Additionally, in certain examples, multiple discrete levels of proximity or a continuous spectrum of proximity may be employed to simulate, for example, the way that sound naturally drops off with distance from a sound source in the real world. For example, a vicinity 512-2 is shown in FIG. 5B that is larger than, and concentric with, vicinity 512-1. In certain examples, location-based controls may allow for all users whose avatars 318 are within (e.g., entirely within, at least partially within, etc.) vicinity 512-2 to receive impromptu communications from user 302-1, but users whose avatars 318 are further away from avatar 318-1 may be presented with the communications at a lower sound intensity level (e.g., a lower volume) than users whose avatars 318 are closer to avatar 318-1. For example, ignoring communication controls other than location-based controls, a spoken communication by user 302-1 may be presented at a relatively high sound intensity level for users represented by avatars 318-2 and 318-7, at a lower sound intensity level for the user represented by avatar 318-5, at an even lower sound intensity level for the user represented by avatar 318-3, and may not be presented at all to users represented by other avatars outside of vicinity 512-2 (e.g., avatars 318-4, 318-6, 318-8, etc.).

Sound intensity level may drop off in any suitable way with respect to vicinities 512-1 and/or 512-2. For example, in one implementation, the sound intensity level may be the same (e.g., a full sound intensity level) for users represented by each avatar 318 within vicinity 512-1 while dropping off (e.g., in a step-wise fashion, gradually with distance, etc.) for users represented by avatars outside vicinity 512-1 but still within vicinity 512-2. As another example for a different implementation (or for different settings of the same implementation), sound intensity level may be configured to drop off for all users whose avatars are within vicinity 512-2 based on the respective distance from avatar 318-1 (without regard to vicinity 512-1).

Because of location-based communication controls, users (e.g., employees 504) may be free to move their avatars 318 around within a shared virtual space (e.g., within virtual office space 506). For example, in a similar way as an employee may walk over to a different area (e.g., a particular desk clump) of a physical office space to converse with one or more other employees there, a user may control his or her avatar 318 within virtual office space 506 to work in his or her assigned workspace 508, to approach another employee or group to start a conversation, to move around the space to listen in on other conversations that may be occurring within the virtual office space, and so forth. Additionally, if a user is not available for any such communication (e.g., because he or she has not logged in to the portal or is in a meeting, etc.), the user's avatar 318 may not be shown to be located within the virtual office space at all in some examples. For instance, as will be described in more detail below, the avatar may not spawn into existence in the shared virtual space until the user is signed into the portal and the avatar may be relocated to a virtual conference room with other avatars when the user is engaged in a meeting with the users represented by those avatars.

Another type of control that may be placed on communication is availability-based control. Availability-based control refers to any limits placed on communication (e.g., whether a user is presented with a particular impromptu communication, whether a user is able to be invited to engage in a formal communication session, etc.) based on an availability status that the user either explicitly selects or that is implicitly set (e.g., when the user is in a meeting, etc.). For example, certain communication actions such as the presentation of an impromptu communication or the receiving of an invitation to initiate a communication session (e.g., a ringing sound for an audio or video call session, a meeting invitation for a meeting or whiteboarding session, etc.) may be delivered only to users whose availability status allows for such communications.

To illustrate, different backgrounds depicted for various avatar 318 in FIG. 5B will be understood to represent different availability statuses associated with the users of these avatars at a particular moment in time represented by this snapshot of virtual office space 506. In certain implementations, these backgrounds may be represented in other ways such as by different colors outlining the avatars, different shapes or sizes of the avatars, and/or in any other manner as may serve a particular implementation.

For this example, a first availability status is represented with a lightly dotted background such as is shown for avatars 318-1, 318-2, 318-3, and 318-4. This availability status will be understood to represent a highest level of availability (e.g., a "green" level in certain implementations) in which the user is available to receive impromptu communications or to be invited to and/or engage in communication sessions. For instance, a user may elect to use this availability status under normal circumstances when the user is working but does not mind interacting with others if they have something to say (e.g., analogous to working with an open door in a physical office space).

A second availability status is represented with a diagonal crosshatching pattern such as is shown for avatars 318-5 and 318-6. This availability status will be understood to represent a lower level of availability (e.g., a "red" level in certain implementations) in which the user is unavailable to receive impromptu communications but may still receive invitations to engage in communication sessions. For instance, a user may elect to use this availability status when he or she needs to focus in for a deadline and does not wish to be distracted (e.g., analogous to working with a closed door in a physical office space).

A third availability status is represented with a grid crosshatching pattern such as is shown for avatars 318-7 and 318-8. This availability status will be understood to represent a level of availability (e.g., an "orange" level in certain implementations) in which the user is either already engaged in a communication session (e.g., on an active call, in a meeting, etc.) or is so intent on staying focused that he or she does not want to receive impromptu communications or invitations to engage in communication sessions. For instance, this availability status may be automatically selected when the user is in an active communication session or the user may select it when he or she is physically with someone (e.g., an in-person interview) or otherwise wishes to not be disturbed in any way (e.g., analogous to blocking calls and hanging a "Do Not Disturb" sign in a physical office space).

As has been described, a particular avatar 318 may simultaneously indicate various pieces of information. For example, the avatar 318 may indicate the identity of the user (e.g., by presenting a photo, likeness, or other representation of the user), the availability status of the user (e.g., by way of color, size, pattern, etc.), and the virtual location with which the user is associated within virtual office space 506. Additionally, in certain implementations, avatars 318 may further indicate other pieces of information as may serve a particular implementation. For instance, if a user is actively speaking (e.g., originating an impromptu communication), the avatar 318 of the user may indicate this graphically by pulsing, changing color, emitting a graphical representation of sound waves, or the like. This type of feature could provide social cues to facilitate users in deciding when to speak with one another (e.g., seeing that another user is speaking, a user may decide to virtually walk over and see what the other user is talking about or may decide to wait until the current conversation is over before attempting communication, etc.). As another example, if a user has not explicitly changed his or her availability status but is detected to be inactive (e.g., detected to no longer be sitting at his or her desk, detected to have not pressed a key in a certain amount of time, etc.) the user's avatar may reflect that the availability status may be in question such that if another user talks to the user in an impromptu communication, there is a chance the user is not there to actually receive the impromptu communication.

To illustrate location-based and availability-based communication controls in operation in the example of virtual office space 506 shown in FIG. 5B, FIG. 5C shows an illustrative chart 514 indicating whether and how different types of communications by user 302-1 (i.e., "User 1," the user represented by avatar 318-1) may be presented to various other users (i.e., "User 2" through "User 8," the users represented, respectively, by avatars 318-2 through 318-8) based on virtual proximity and availability status of the users. Specifically, on a first row of chart 514, User 1 is indicated to be delivering an impromptu spoken communication that system 100 either presents or abstains from presenting to Users 2 through 8. On a second row of chart 514, User 1 is indicated to be initiating a formal communication session (e.g., placing an audio or video call, starting a meeting or whiteboarding session, etc.) that system 100 either provides or omits an option for Users 2 through 8 to accept (e.g., either putting the call through to be answered or blocking the call so as not to disturb the intended recipient). For each user represented in chart 514, the background shown matches the background of the respective avatar 318 from FIG. 5B and will be understood to indicate the availability status of the user as described above.

Because avatars 318-2 and 318-3 of Users 2 and 3 are both relatively proximate to avatar 318-1 and because the availability status of Users 2 and 3 is set to the highest level, both User 2 and User 3 are presented with User 1's impromptu spoken communication and are provided with an option to accept a communication session that User 1 has attempted to initiate. Because avatar 318-2 is more proximate to avatar 318-1 than is avatar 318-3, chart 514 also indicates that there may be a difference in the sound intensity level with which the impromptu spoken communication is delivered (e.g., relatively "High Sound Intensity" for User 2 and relatively "Low Sound Intensity" for User 3).

In contrast, although User 5 also has the availability status set to the highest level (the same level used by User 2 and 3), avatar 318-4 of User 5 is shown to not be proximate to avatar 318-1 of User 1 as User 1 speaks. For example, avatar 318-4 may be determined to not be proximate to avatar 318-1 because it is located outside of vicinities 512-1 and 512-2. As shown in chart 514, a consequence of the lack of proximity here is that system 100 abstains from presenting the impromptu spoken communication to User 5 in spite of his or her availability status. However, as a result of User 5's availability, User 5 is still provided with an option to accept a communication session that User 1 initiates.

Communication controls for User 5 are shown to be just the opposite of those for User 5. Specifically, the location of avatar 318-5 for User 5 is shown to be proximate to avatar 318-1 (e.g., at least partially within vicinities 512-1 and 512-2) while the availability status is set to a lower level that indicates that impromptu communications are not currently allowed. Accordingly, as shown in chart 514, while User 5 is virtually proximate enough to User 1 to be able to hear the impromptu communication, system 100 abstains from presenting the impromptu communication due to the lower availability level of User 5. This result is the same as the result for User 6, who has the same reduced availability level and also happens to be less proximate to User 1. In both cases, impromptu communications are not presented but the users are still provided options to accept communication sessions that User 1 (or other users) initiate.

As with avatar 318-5 of User 5, avatar 318-7 of User 7 is also shown to be located proximate to avatar 318-1 of User 1 (e.g., at least partially within vicinities 512-1 and 512-2). However, User 7 has an availability status indicating that he or she should not be disturbed by either impromptu communications or by requests to initiate communication sessions (e.g., possibly because User 7 may already be engaged in a communication session). As a result, for User 7, system 100 abstains from presenting impromptu communication spoken by User 1 and also omits (i.e., does not provide) an option to accept an initiation of a communication session. This result is the same as the result for User 8, who has the same availability level and also happens to be less proximate to User 1. In both cases, impromptu communications are not presented and session initiation requests are not provided so that the users are not disturbed as long as their availability statuses stay at this level.

To further describe and illustrate how system 100 may provide communication between users based on virtual proximity and availability status, several example scenarios will now be described with reference to FIG. 5B, as well as FIGS. 6 through 8.

In a first illustrative scenario, system 100 may determine that, along with proximity to the location of avatar 318-2, the first virtual location of avatar 318-1 is also proximate to a third virtual location of avatar 318-3 in the shared space. As mentioned above, avatar 318-3 may represent a third user (not explicitly shown) who is located remotely from both the first and second users (i.e., users 302-1 and 302-2). System 100 may detect an availability status of the third user and provide, based on the availability status of the third user and based on the determination that the first virtual location of avatar 318-1 is also proximate to the third virtual location of avatar 318-3, the audio content representative of the spoken communication (i.e., the same audio content spoken by the first user as an impromptu communication for presentation to the second user) for presentation to the third user. It will be understood that the providing of the audio content for presentation to the third user may be performed concurrently with the providing of the audio content for presentation to the second user. As such, both the second and third users may simultaneously hear the impromptu communication in a manner analogous to a natural conversation in a physical space.

As shown in FIG. 5B, avatar 318-2 may be more proximate than avatar 318-3 to avatar 318-1 as the first user provides the spoken communication. As such, the providing of the audio content for presentation to the second user by system 100 may include determining a first proximity value (e.g., a virtual distance value, a proximity level, etc.) that quantifies how proximate the first virtual location of avatar 318-1 is to the second virtual location of avatar 318-2. In like manner, the providing of the audio content for presentation to the third user by system 100 may similarly include determining a second proximity value quantifying how proximate the first virtual location is to the third virtual location of avatar 318-3. For the situation illustrated in FIG. 5B, in which the first and second proximity values indicate that the first virtual location is more proximate to the second virtual location than to the third virtual location, system 100 may provide the audio content for presentation to the second user at a first sound intensity level that is based on the first proximity value (e.g., a relatively high sound intensity level) and may provide the audio content for presentation to the third user at a second sound intensity level that is based on the second proximity value and that is less than the first sound intensity level (e.g., a relatively low sound intensity level).

Figure 6:
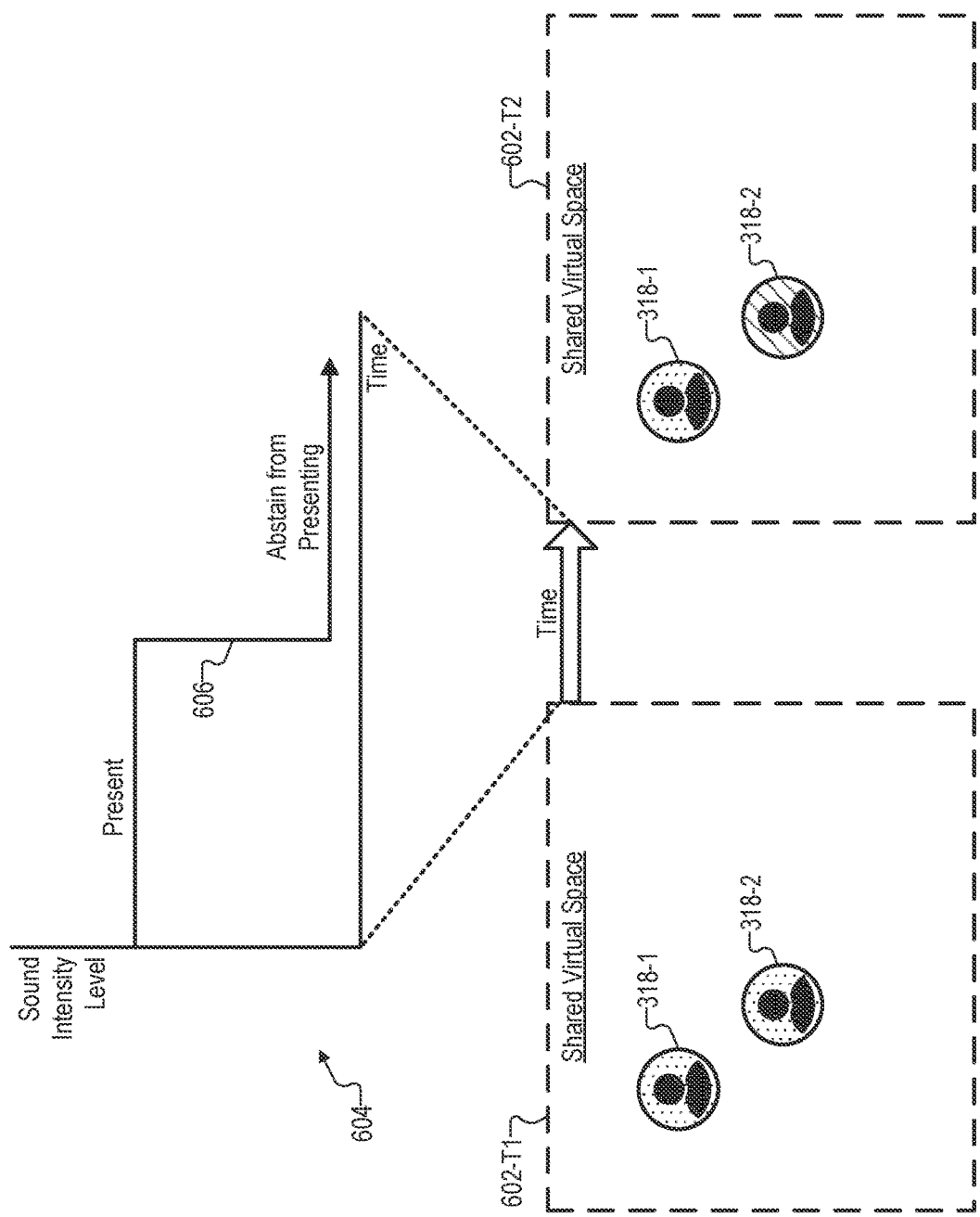
FIGS. 6-8 show different illustrative ways that communication provided between users may change over time based on virtual proximity and availability status of the users in accordance with principles described herein.

Another illustrative scenario is illustrated by FIG. 6, which shows one way that communication provided between the first and second users (i.e., users 302-1 and 302-2, represented by avatars 318-1 and 318-2, respectively) may change over time based on virtual proximity and availability status of the users. As has been described, the detecting of the availability status of the second user by system 100 at one point in time may include detecting that the second user is available for receiving impromptu communication from other users, and the audio content for presentation to the second user may be representative of impromptu communication by the first user and may be provided for impromptu presentation to the second user. At a subsequent time, however, system 100 may detect an updated availability status of the second user that may indicate, for example, that the second user is unavailable for receiving impromptu communications. Accordingly, based on the updated availability status of the second user, system 100 may abstain from providing additional audio content for presentation to the second user (e.g., additional audio content representative of an additional spoken communication by the first user).

This scenario is depicted in FIG. 6 by depicting a shared virtual space (e.g., virtual office space 506 or another suitable shared virtual space) at two different moments in time. Specifically, a shared virtual space 602-T1 represents the shared virtual space at one moment in time (time T1) when the availability status of the second user represented by avatar 318-2 indicates availability for receiving impromptu communication from other users, while a shared virtual space 602-T2 represents the shared virtual space at a subsequent moment in time (time T2) when the availability status of the second user represented by avatar 318-2 has been updated to indicate unavailability for receiving such impromptu communications. Associated with this passage of time, a graph 604 showing time along the x-axis and sound intensity level of impromptu communication along the y-axis illustrates that the first user's impromptu communication is presented until a particular moment 606 when the second user's availability status changes, after which system 100 abstains from presenting the impromptu communication.

As has been described, it will be understood that even though impromptu communication is not presented to the second user at time T2, communication may still be possible by initiation of a more formal communication session. For example, system 100 may receive, while the updated availability status indicates that the second user is unavailable for receiving the impromptu communications, a request by the first user to initiate a communication session between the first and second users (e.g., an audio or video call, a meeting, a whiteboarding or screensharing session, etc.). Based on the request, system 100 may initiate the communication session between the first and second users such that the first user is still able to communicate with the second user if needed but the second user can avoid potential distraction of impromptu communications as he or she tries to stay focused. As another example, system 100 may provide a "touch" feature that would allow the first user to request that the second user make himself or herself available (at least temporarily) for impromptu communication. This feature may simulate a physical touch (e.g., a tap on the shoulder, etc.) that a first person may deliver to a second person in a physical space to request attention even when the second person is zoned in and not paying attention to the outside world (e.g., working with headphones on or earplugs in to stay focused, etc.). Another illustrative scenario is illustrated by FIG. 7, which shows another way that communication provided between the first and second users respectively represented by avatars 318-1 and 318-2 may change over time based on virtual proximity and availability status of the users. Again in this example, the first user represented by avatar 318-1 may deliver an impromptu communication to the second user represented by avatar 318-2, and, accordingly (e.g., as a consequence of the virtual proximity and availability status of the second user), system 100 may provide audio content representative of the impromptu communication for presentation to the second user. As part of this providing, system 100 may determine a proximity value quantifying how proximate the first virtual location of avatar 318-1 is to the second virtual location of avatar 318-2. As such, the providing of the audio content for presentation to the second user may be done using a sound intensity level that is based on the proximity value. For instance, the audio content may be presented at a greater sound intensity level when the first and second virtual locations are more proximate than when the first and second virtual locations are less proximate. Subsequently, at a later time when the proximity between the avatars changes, the sound intensity level may be altered (e.g., increased or reduced) accordingly. In this way, the second user will continually have a sense of how proximate the first user is virtually located based on the sound intensity level at which the impromptu communication is presented.

Figure 7:
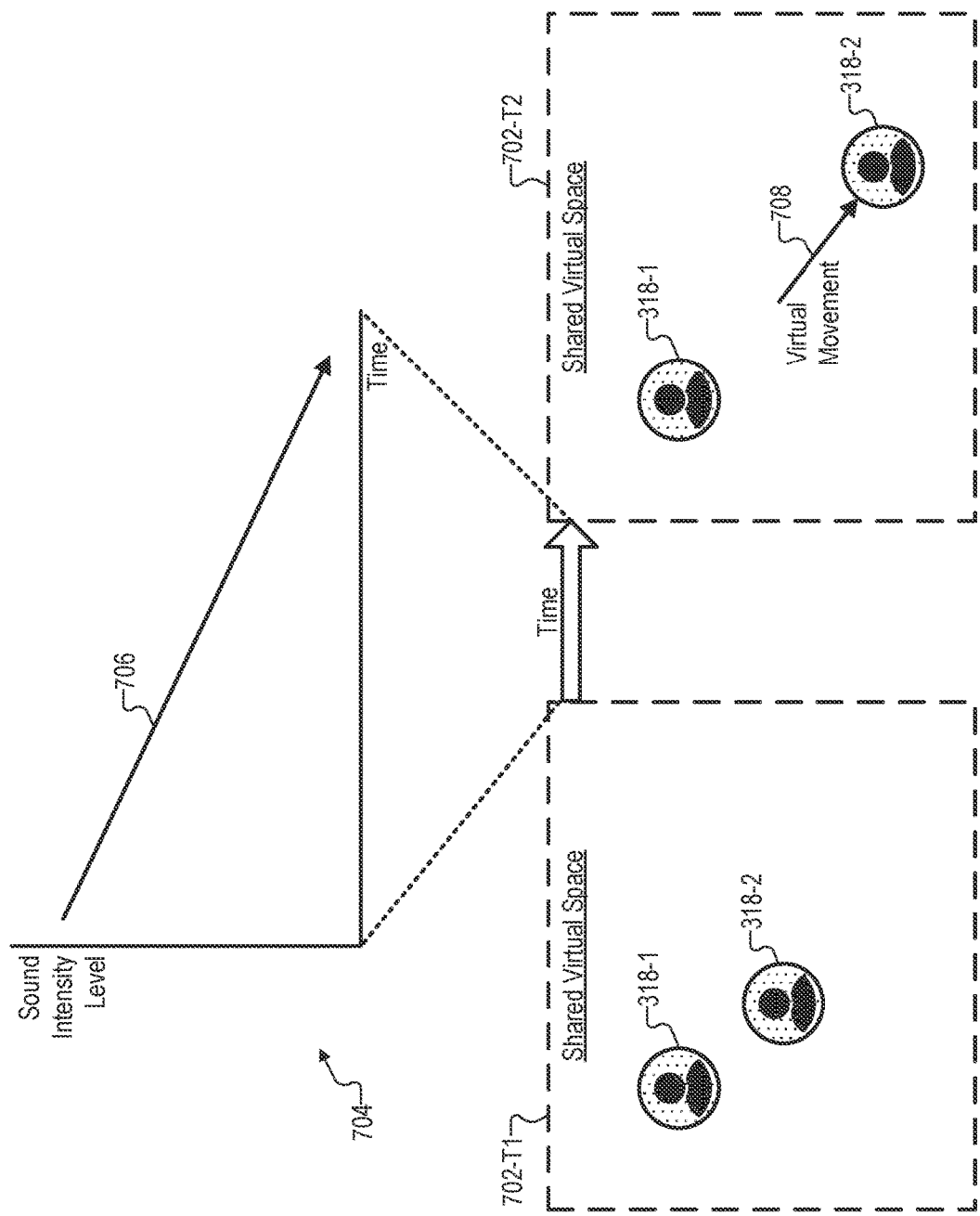

This example scenario is depicted in FIG. 7 by depicting a shared virtual space (e.g., virtual office space 506 or another suitable shared virtual space) at two different moments in time. Specifically, a shared virtual space 702-T1 represents the shared virtual space at one moment in time (time T1) when the proximity between avatars 318-1 and 318-2 may be quantified by a first proximity value, while a shared virtual space 702-T2 represents the shared virtual space at a subsequent moment in time (time T2) when the proximity between avatars 318-1 and 318-2 is greater and may be quantified by a second proximity value that is larger than the first proximity value. Associated with this passage of time, a graph 704 showing time along the x-axis and sound intensity level of impromptu communication along the y-axis illustrates that a sound intensity level 706 of the first user's impromptu communication continually decreases over time as the proximity between the avatars 318 decreases (e.g., as a virtual movement 708 occurs that puts avatar 318-2 at a further and further distance from avatar 318-1).

While sound intensity level 706 at which the impromptu communication is presented is illustrated in FIG. 7 as falling off linearly with virtual movement 708 of avatar 318-2 away from avatar 318-1, it will be understood that the sound intensity level may be correlated with proximity (e.g., with detected proximity values quantifying the proximity) in any manner as may serve a particular implementation. For example, the level may decrease linearly and until reaching zero at a particular threshold proximity at which the second user is no longer presented with the impromptu communication at all. As another example, the level may fall off in an asymmetrical and/or non-linear manner such that it decreases more sharply once a particular threshold proximity is reached (e.g., once the avatar leaves a vicinity such as vicinity 512-1 but while the avatar is still within vicinity 512-2), such that the intensity decreases in an asymptotic way that never quite reaches zero but grows very quiet, or in any other non-linear manner as may serve a particular implementation. In certain examples, the level may decrease symmetrically (i.e., regardless of which direction the second user is from the first user) while the level may decrease asymmetrically in other examples (e.g., based on the direction avatar 318-1 is facing, etc.). In certain implementations, the sound intensity level may not fall off gradually but in a step-wise or an abrupt, on-off manner. Additionally, system 100 may provide an option to the speaking user (the first user in this example) and/or to the listening user (the second user in this example) to allow the users to select user-customizable ways in which the sound intensity level drops off with proximity, or to define one or more proximity thresholds (e.g., vicinities 512, etc.) that will influence the sound intensity reduction.

As has been described, even as the sound intensity level of the impromptu communication changes between time T1 and time T2, another option that is continuously available to the first user is to initiate a formal communication session in the ways that have been described.

Figure 8:
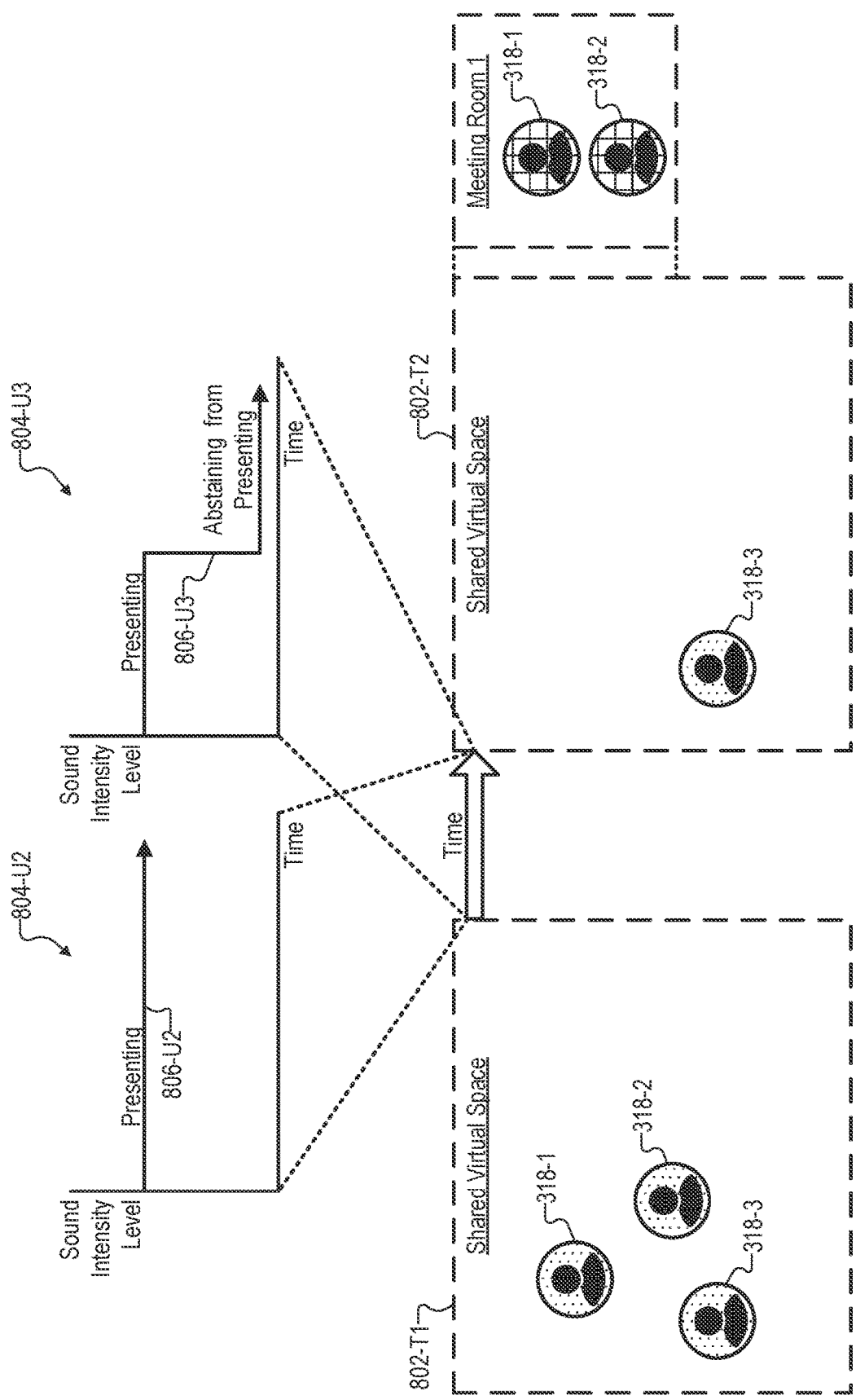

Another illustrative scenario is illustrated by FIG. 8, which shows another way that communication provided between the first and second users respectively represented by avatars 318-1 and 318-2 may change over time based on virtual proximity and availability status of the users. In FIG. 8, a third user represented by avatar 318-3 is also shown to be involved in this scenario. Concurrent with providing audio content representative of the spoken communication by the first user (e.g., as the first user delivers and the second user receives an impromptu communication), system 100 may detect a request by one of the first or second users to initiate a communication session between the first and second users. As such, based on the request, system 100 may initiate the communication session (e.g., a private meeting, an audio or video call, etc.) between the first and second users.

While the first and second users may be able to communicate with one another before and after the initiation of the communication session, the presence of avatar 318-3 (representing the third user) illustrates a significant effect that this scenario may have upon a third party with whom the communication session is not initiated. Specifically, prior to the initiating of the communication session between the first and second users, the audio content representative of the spoken communication by the first user (e.g., the impromptu communication being delivered by the first user) may be provided for presentation not only to the second user but also to the third user represented by avatar 318-3 (which is located at a third virtual location in the shared virtual space that is proximate to the first virtual location of avatar 318-1, as shown). However, subsequent to the initiating of the communication session between the first and second users, further audio content of spoken communication by the first user may no longer be provided for presentation to the third user. For example, upon initiation of the communication session, avatars 318-1 and 318-2 may be automatically transported to a different location (e.g., a virtual meeting room, etc.) such that their communication is no longer impromptu communication and avatar 318-3 is no longer proximate to avatars 318-1 and 318-2.

Similar to FIGS. 6 and 7, this example scenario is depicted in FIG. 8 by depicting a shared virtual space (e.g., virtual office space 506 or another suitable shared virtual space) at two different moments in time. Specifically, a shared virtual space 802-T1 represents the shared virtual space at one moment in time (time T1) when avatars 318-1, 318-2, and 318-3 are all proximate enough to one another to engage in impromptu communication, while a shared virtual space 802-T2 represents the shared virtual space at a subsequent moment in time (time T2) when avatars 318-1 and 318-2 have transported away from avatar 318-3 into a meeting room ("Meeting Room 1") that may be spawned on demand to accommodate the communication session that is initiated between the first and second users.

Associated with the passage of time, a first graph 804-U2 shows time along the x-axis and sound intensity level of communication as presented to the second user (U2) along the y-axis, while a second graph 804-U3 shows time along the x-axis and sound intensity level of communication as presented to the third user (U3) along the y-axis. Graph 804-U2 illustrates that a sound intensity level 806-U2 presented to the second user (of the first user's spoken communication) remains constant before and after the impromptu communication is converted into the private communication session in the meeting room. In contrast, graph 804-U3 illustrates that a sound intensity level 806-U3 presented to the third user (of the first user's spoken communication) drops to zero when the communication session that the third user is involved in begins (i.e., when system 100 ceases "Presenting" the audio communication and begins "Abstaining from Presenting" the audio communication).

While the meeting room ("Meeting Room 1") illustrated in FIG. 8 is shown to automatically spawn off to the side of the shared virtual space to accommodate the communication session between the first and second users in real time, it will be understood that, in other implementations, meeting rooms may be permanently connected to the shared virtual space, may be incorporated within the shared virtual space, or may have any other suitable relationship to the rest of the shared virtual space as may serve a particular implementation. In certain examples, no meeting room may be shown such that the virtual locations of avatars 318-1 and 318-2 do not change when the communication session is initiated, but the availability status illustrated in connection with the avatars is still shown to change.

In various implementations, shared virtual spaces may be entirely virtual or may correspond to real-world, physical virtual spaces in any manner as may serve a particular implementation.

As one example, FIGS. 3 and 5A-5B were described above to illustrate an example of a shared virtual space implemented as a virtual office space associated with an organization employing a workforce of employees that includes a plurality of users (e.g., including first and second users). This shared virtual space (e.g., shared virtual space 316 or virtual office space 506) may be understood to not be based on any physical office space used by the organization, but, rather, to be entirely virtual (e.g., existing only in a virtual universe and not the physical world). In such an implementation, the first user (e.g., user 302-1) may be located at a first physical location (e.g., site 306-1) remote from any physical office space used by the organization (e.g., if indeed the organization maintains physical office space and is not a virtual organization with no physical office space). The second user (e.g., user 302-2) may then be located at a second physical location (e.g., site 306-2) that is also remote from the first physical location and any physical office space used by the organization.

Figure 9:
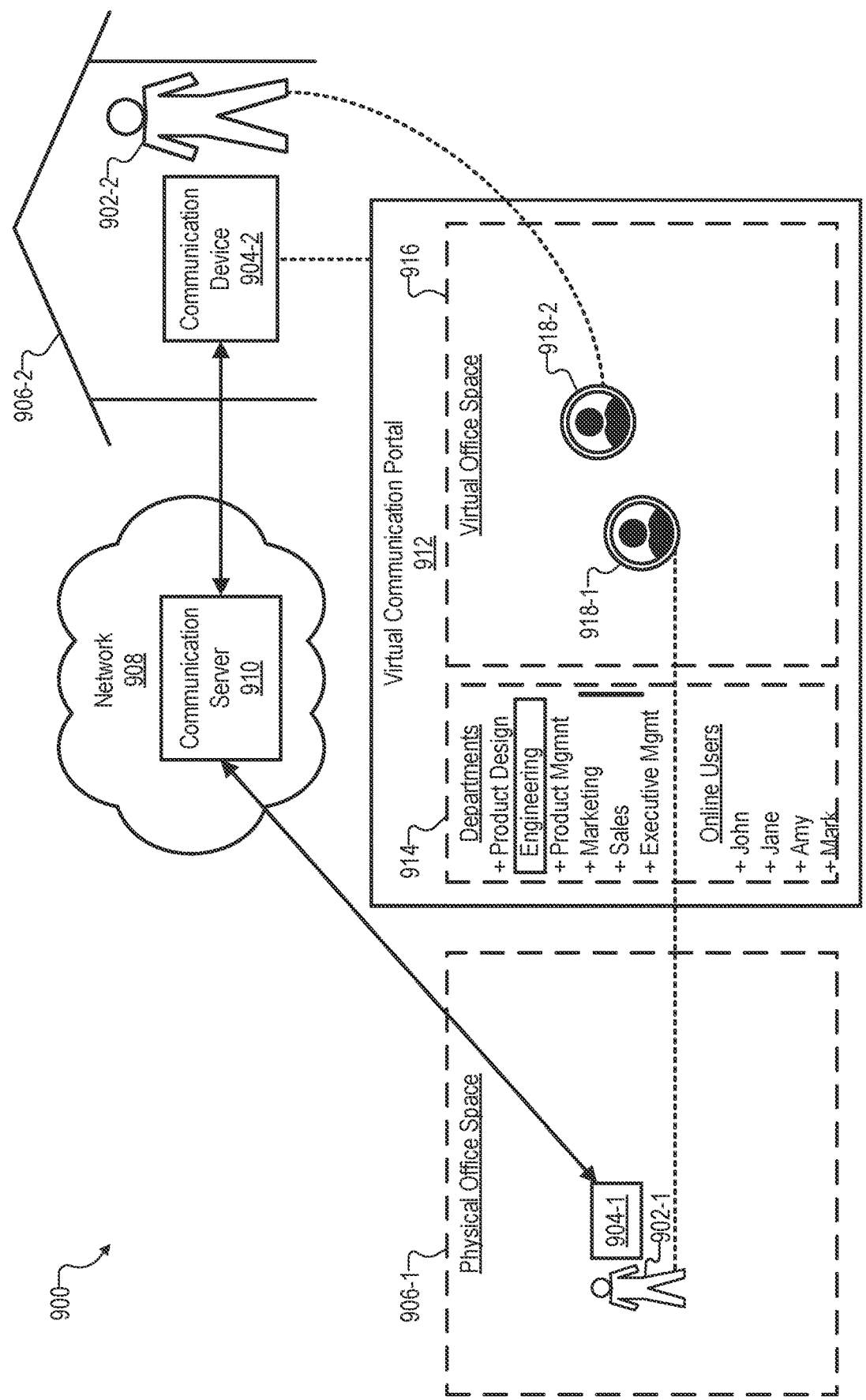
FIG. 9 shows another illustrative configuration in which the communication provider system of FIG. 1 may operate in accordance with principles described herein.

In contrast, as another example, FIG. 9 shows an illustrative configuration 900 in which system 100 may operate and that illustrates an example of a different type of shared virtual space. Specifically, similar to configuration 300 of FIG. 3, configuration 900 shows first and second users 902 (i.e., first user 902-1 and second user 902-2) that use first and second communication devices 904 (i.e., first communication device 904-1 and second communication device 904-2) from first and second sites 906 (i.e., sites 906-1 and 906-2) to communicate by way of a network 908 and, potentially, a communication server 910. In this way, the users may log in to use a virtual communication portal 912 having a navigation panel 914 and a virtual office space 916 that includes avatars 918 for the users (i.e., avatar 918-1 representing user 902-1 and avatar 918-2 representing user 902-2).

All of these components may be understood to operate similarly to analogous components described above in relation to configuration 300. However, as shown, rather than site 906-1 being a home of user 902-1 (or other remote site from which user 902-1 chooses to work), in configuration 900, site 906-1 where user 902-1 is located is shown to be a physical office space. As such, the shared virtual space presented within virtual communication portal 912 may be a virtual office space 916 that is associated with an organization employing a workforce of employees that includes users 902-1 and 902-2, and virtual office space 916 may be based on the physical office space used by the organization. As shown, user 902-1 may be located at this physical office space used by the organization (i.e., site 906-1) while user 902-2 may be located at a physical location remote from the physical office space used by the organization.

By modeling virtual office space 916 after the physical office space of site 906-1, system 100 may present a hybrid of a real and a virtual office space to the employees of the organization. For example, user 902-1 may physically be located in his or her workspace in the physical office and this may be reflected by the virtual location of avatar 918-1 within virtual office space 916. Though user 902-2 may not be physically located in his or her workspace proximate to that of user 902-1 within the physical office space (e.g., because user 902-2 is working remotely from site 906-2), users 902-1 and 902-2 may communicate in an impromptu manner as if they were both located in their respective workplaces within the physical office space.

A 2D or 3D model of the physical office space may be generated based on any blueprints, floor plans, 3D scans, or other information or technology as may serve a particular implementation. Based on such a model, system 100 may generate and present virtual office space 916 to virtually replicate and/or have any suitable similarities (e.g., geometric, layout, décor, etc.) with physical office space 906-1 as may serve a particular implementation. In certain examples, certain characteristics of virtual office space 916 may replicate or be based on the physical office space of site 906-1, while other characteristics may be customized and/or created to be only virtual with no real-world analog.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
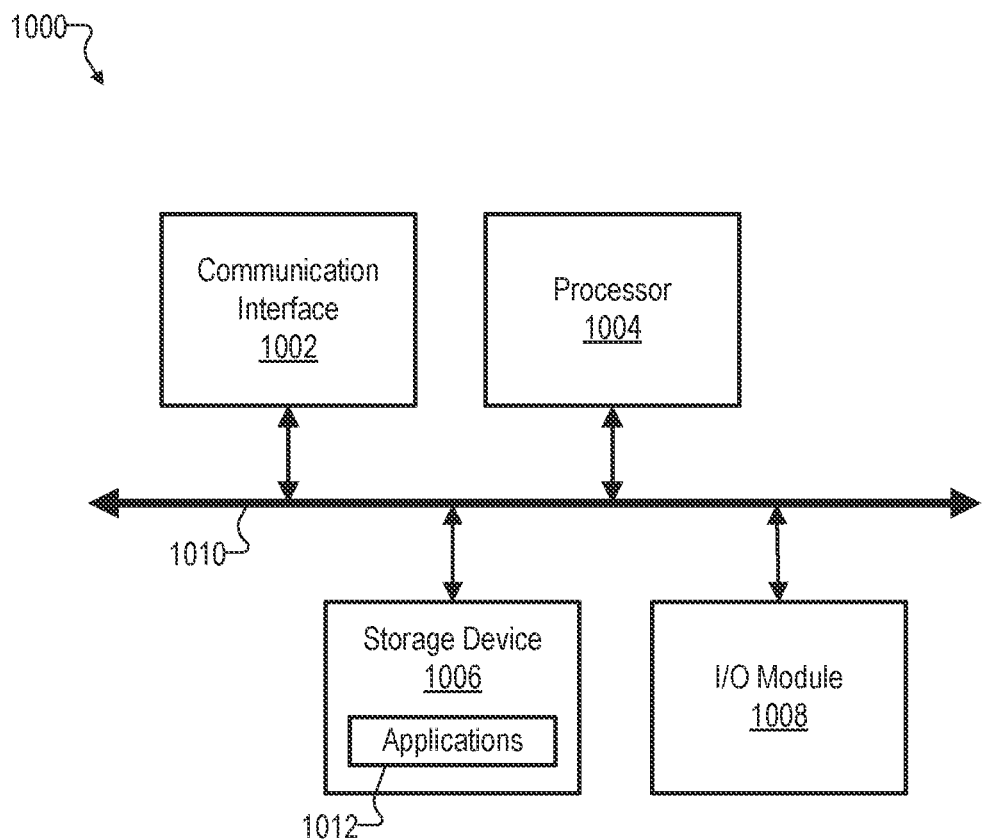
FIG. 10 shows an illustrative computing device that may implement communication provider systems and/or other systems and devices described herein in accordance with principles described herein.

FIG. 10 shows an illustrative computing device 1000 that may implement communication provider systems and/or other systems and devices described herein in accordance with principles described herein. For example, computing device 1000 may include or implement (or partially implement) a communication provider system such as system 100 or any component included therein or any system associated therewith (e.g., communication devices 304 or 904, elements of networks 308 or 908, communication servers 310 or 910, etc.).

As shown in FIG. 10, computing device 1000 may include a communication interface 1002, a processor 1004, a storage device 1006, and an input/output (I/O) module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
   determining, by a communication provider system, respective proximity values quantifying how proximate a first virtual location of a first avatar in a shared virtual space is to each of a plurality of additional virtual locations of a plurality of additional avatars in the shared virtual space, wherein the first avatar represents a speaking user for a particular interaction and the plurality of additional avatars represent listening users for the particular interaction;
   determining, by the communication provider system based on the respective proximity values, respective proximity levels within which each of the plurality of additional virtual locations is entirely or partially located, wherein the respective proximity levels are included in a plurality of discrete proximity levels defined by a plurality of nested proximity thresholds each enclosing the first virtual location;
   identifying, by the communication provider system for each of the respective proximity levels, one or more options selected by the speaking user to specify user-customizable ways in which sound intensity of communication spoken by the speaking user is to drop off for the plurality of additional virtual locations;
   detecting, by the communication provider system, respective availability statuses of the listening users; and
   providing, by the communication provider system based on the respective availability statuses, of the listening users, audio content for presentation to the listening users, the audio content provided for presentation at respective sound intensity levels based on the one or more options selected by the speaking user for each of the respective proximity levels.

2. The method of claim 1, wherein:
the shared virtual space is a virtual office space associated with an organization employing a workforce of employees that includes the speaking and listening users;
each employee in the workforce is associated with a different avatar that is represented in the shared virtual space when the employee is logged into a virtual communication portal;
the first virtual location of the first avatar is associated with a first virtual workspace assigned to the speaking user; and
the plurality of additional virtual locations are associated with one or more additional virtual workspaces assigned to the listening users, the one or more additional virtual workspaces proximate to the first virtual workspace within the shared virtual space.

3. The method of claim 1, wherein:
the detecting of the respective availability statuses of the listening users includes detecting that a particular listening user is available for receiving impromptu communication from other users;
the audio content for presentation to the particular listening user is representative of impromptu communication by the speaking user and is provided for impromptu presentation to the particular listening user; and
the method further comprises:
   detecting, by the communication provider system subsequent to the detecting of the respective availability statuses, an updated availability status of the particular listening user, the updated availability status indicating that the particular listening user is unavailable for receiving impromptu communications; and
   abstaining from providing, by the communication provider system based on the updated availability status of the particular listening user, additional audio content for presentation to the particular listening user, the additional audio content representative of an additional spoken communication by the speaking user for an additional interaction.

4. The method of claim 3, further comprising:
receiving, by the communication provider system while the updated availability status indicates that the particular listening user is unavailable for receiving the impromptu communications, a request by the speaking user to initiate a communication session between the speaking user and the particular listening user; and
initiating, by the communication provider system based on the request, the communication session between the speaking user and the particular listening user.

5. The method of claim 1, wherein:
the respective proximity levels determined based on the respective proximity values include different discrete proximity levels of the plurality of discrete proximity levels; and
the respective sound intensity levels at which the audio content is provided include different sound intensity levels.

6. The method of claim 1, further comprising:
detecting, by the communication provider system concurrent with the providing of the audio content for presentation to the listening users, a request by one of the speaking user or a particular listening user to initiate a communication session between the speaking user and the particular listening user; and
initiating, by the communication provider system based on the request, the communication session between the speaking user and the particular listening user.

7. The method of claim 6, wherein:
prior to the initiating of the communication session between the speaking user and the particular listening user, the audio content for presentation to the particular listening user is further provided for presentation to an additional listening user; and
subsequent to the initiating of the communication session between the speaking user and the particular listening user, the audio content is no longer provided for presentation to the additional listening user.

8. The method of claim 1, wherein:
the shared virtual space is a virtual office space associated with an organization employing a workforce of employees that includes the speaking and listening users;
the virtual office space is not based on any physical office space used by the organization;
the speaking user is located at a first physical location remote from any physical office space used by the organization; and
at least one of the listening users is located at a second physical location remote from the first physical location and from any physical office space used by the organization.

9. The method of claim 1, wherein:
the shared virtual space is a virtual office space associated with an organization employing a workforce of employees that includes the speaking and listening users;
the virtual office space is based on a physical office space used by the organization;
the speaking user is located at the physical office space used by the organization; and
at least one of the listening users is located at a physical location remote from the physical office space used by the organization.

10. The method of claim 1, wherein at least one proximity threshold of the plurality of nested proximity thresholds enclosing the first virtual location is customizable by the speaking user.

11. A system comprising:
a memory storing instructions; and
a processor communicatively coupled to the memory and configured to execute the instructions to:
   determine respective proximity values quantifying how proximate a first virtual location of a first avatar in a shared virtual space is to each of a plurality of additional virtual locations of a plurality of additional avatars in the shared virtual space, wherein the first avatar represents a speaking user for a particular interaction and the plurality of additional avatars represent listening users for the particular interaction;
   determine, based on the respective proximity values, respective proximity levels within which each of the plurality of additional virtual locations is entirely or partially located, wherein the respective proximity levels are included in a plurality of discrete proximity levels defined by a plurality of nested proximity thresholds each enclosing the first virtual location;

identify, for each of the respective proximity levels, one or more options selected by the speaking user to specify user-customizable ways in which sound intensity of communication spoken by the speaking user is to drop off for the plurality of additional virtual locations;

detect respective availability statuses of the listening users; and provide, based on the respective availability statuses of the listening users, audio content for presentation to the listening users, the audio content provided for presentation at respective sound intensity levels based on the one or more options selected by the speaking user for each of the respective proximity levels.

12. The system of claim 11, wherein:

the shared virtual space is a virtual office space associated with an organization employing a workforce of employees that includes the speaking and listening users;

each employee in the workforce is associated with a different avatar that is represented in the shared virtual space when the employee is logged into a virtual communication portal;

the first virtual location of the first avatar is associated with a first virtual workspace assigned to the speaking user; and the plurality of additional virtual locations are associated with one or more additional virtual workspaces assigned to the listening users, the one or more additional virtual workspaces proximate to the first virtual workspace within the shared virtual space.

13. The system of claim 11, wherein:

the detecting of the respective availability statuses of the listening users includes detecting that a particular listening user is available for receiving impromptu communication from other users;

the audio content for presentation to the particular listening user is representative of impromptu communication by the speaking user and is provided for impromptu presentation to the particular listening user; and the processor is further configured to execute the instructions to:

detect, subsequent to the detecting of the respective availability statuses, an updated availability status of the particular listening user, the updated availability status indicating that the particular listening user is unavailable for receiving impromptu communications;

abstain from providing, based on the updated availability status of the particular listening user, additional audio content for presentation to the particular listening user, the additional audio content representative of an additional spoken communication by the speaking user for an additional interaction;

receive, while the updated availability status indicates that the particular listening user is unavailable for receiving the impromptu communications, a request by the speaking user to initiate a communication session between the speaking user and the particular listening user; and initiate, based on the request, the communication session between the speaking user and the particular listening user.

14. The system of claim 11, wherein:

the respective proximity levels determined based on the respective proximity values include different discrete proximity levels of the plurality of discrete proximity levels; and the respective sound intensity levels at which the audio content is provided include different sound intensity levels.

15. The system of claim 11, wherein the processor is further configured to execute the instructions to:

detect, concurrent with the providing of the audio content for presentation to the listening users, a request by one of the speaking user or a particular listening user to initiate a communication session between the speaking user and the particular listening user; and initiate, based on the request, the communication session between the speaking user and the particular listening user.

16. The system of claim 11, wherein:

the shared virtual space is a virtual office space associated with an organization employing a workforce of employees that includes the speaking and listening users;

the virtual office space is based on a physical office space used by the organization;

the speaking user is located at the physical office space used by the organization; and at least one of the listening users is located at a physical location remote from the physical office space used by the organization.

17. The system of claim 11, wherein at least one proximity threshold of the plurality of nested proximity thresholds enclosing the first virtual location is customizable by the speaking user.

18. A non-transitory computer-readable medium storing instructions that, when executed, direct a processor of a computing device to:

determine respective proximity values quantifying how proximate a first virtual location of a first avatar in a shared virtual space is to each of a plurality of additional virtual locations of a plurality of additional avatars in the shared virtual space, wherein the first avatar represents a speaking user for a particular interaction and the plurality of additional avatars represent listening users for the particular interaction;

determine, based on the respective proximity values, respective proximity levels within which each of the plurality of additional virtual locations is entirely or partially located, wherein the respective proximity levels are included in a plurality of discrete proximity levels defined by a plurality of nested proximity thresholds each enclosing the first virtual location;

identify, for each of the respective proximity levels, one or more options selected by the speaking user to specify user-customizable ways in which sound intensity of communication spoken by the speaking user is to drop off for the plurality of additional virtual locations;

detect respective availability statuses of the listening users; and provide, based on the respective availability statuses of the listening users, audio content for presentation to the listening users, the audio content provided for presentation at respective sound intensity levels based on the one or more options selected by the speaking user for each of the respective proximity levels.

19. The non-transitory computer-readable medium of claim 18, wherein:
   the respective proximity levels determined based on the respective proximity values include different discrete proximity levels of the plurality of discrete proximity levels; and
   the respective sound intensity levels at which the audio content is provided include different sound intensity levels.

20. The non-transitory computer-readable medium of claim 18, wherein the processor is further configured to execute the instructions to:
   detect, concurrent with the providing of the audio content for presentation to the listening users, a request by one of the speaking user or a particular listening user to initiate a communication session between the speaking user and the particular listening user; and
   initiate, based on the request, the communication session between the speaking user and the particular listening user.

\* \* \* \* \*